United States Patent
Douglas et al.

(10) Patent No.: US 7,809,020 B2
(45) Date of Patent: Oct. 5, 2010

(54) START OF PACKET DETECTION FOR MULTIPLE RECEIVER COMBINING AND MULTIPLE INPUT MULTIPLE OUTPUT RADIO RECEIVERS

(75) Inventors: Bretton Lee Douglas, Normal, IL (US);
Brian D. Hart, Sunnyvale, CA (US);
Fred J. Anderson, Lakeville, OH (US);
Paul J. Stager, Akron, OH (US);
Gregory M. Corsetto, Mountain View, CA (US)

(73) Assignee: Cisco Technology, Inc., San Jose, CA (US)

( * ) Notice: Subject to any disclaimer, the term of this patent is extended or adjusted under 35 U.S.C. 154(b) by 576 days.

(21) Appl. No.: 11/757,878

(22) Filed: Jun. 4, 2007

(65) Prior Publication Data
US 2007/0230403 A1    Oct. 4, 2007

Related U.S. Application Data

(63) Continuation-in-part of application No. 10/698,703, filed on Oct. 31, 2003, now Pat. No. 7,480,234.

(60) Provisional application No. 60/804,069, filed on Jun. 6, 2006, provisional application No. 60/803,964, filed on Jun. 5, 2006.

(51) Int. Cl.
*H04J 3/06* (2006.01)

(52) U.S. Cl. ............... 370/474; 370/503; 370/506; 370/509; 370/520

(58) Field of Classification Search ......... 370/203, 370/503, 335, 342; 455/17, 16, 73; 375/142, 375/144; 270/474, 503, 506, 509, 520
See application file for complete search history.

(56) References Cited

U.S. PATENT DOCUMENTS

| | | | |
|---|---|---|---|
| 6,023,476 A * | 2/2000 | Lo | 370/502 |
| 6,430,198 B1 * | 8/2002 | Moyal et al. | 370/473 |
| 6,785,350 B1 | 8/2004 | Poulbere et al. | 375/343 |
| 7,265,714 B2 * | 9/2007 | Goldberg | 342/378 |
| 7,304,969 B2 * | 12/2007 | Ryan et al. | 370/332 |
| 7,415,661 B2 * | 8/2008 | Keaney et al. | 714/807 |

(Continued)

OTHER PUBLICATIONS

On Preamble Detection in Packet-Based Wireless Networks; Nagaraj et al. 2006 IEEE Ninth International Symposium on Spread Spectrum Techniques and Applications.*

(Continued)

*Primary Examiner*—Salman Ahmed
(74) *Attorney, Agent, or Firm*—Dov Rosenfeld; Inventek

(57) ABSTRACT

A method and an apparatus for detecting the start-of-packet in a wireless receiver operating in a packetized wireless network. One method embodiment includes calculating a plurality of start of packet (SOP) indicators, each for one or more of a plurality of receive chains in the receiver; determining one or more linear combinations of respective pluralities of the calculated SOP indicators to form one or more combined SOP indicators; comparing each of a plurality of SOP indicators or combined SOP indicators, including at least one of the combined SOP indicators to a respective threshold to form one or more respective SOP events; and, in the case there is more than one SOP event, determining a logic function of the SOP events to form a SOP decision event.

20 Claims, 13 Drawing Sheets

U.S. PATENT DOCUMENTS

| | | | | |
|---|---|---|---|---|
| 7,480,234 | B1* | 1/2009 | Hart et al. | 370/208 |
| 2003/0012297 | A1 | 1/2003 | Imamura | 375/295 |
| 2004/0170237 | A1 | 9/2004 | Chadha et al. | 375/343 |
| 2004/0190560 | A1* | 9/2004 | Maltsev et al. | 370/503 |
| 2004/0264561 | A1 | 12/2004 | Alexander et al. | 375/232 |
| 2005/0084028 | A1* | 4/2005 | Yu et al. | 375/267 |
| 2005/0220212 | A1 | 10/2005 | Marsili | 375/275 |
| 2006/0171483 | A1* | 8/2006 | Jia et al. | 375/267 |
| 2006/0182017 | A1 | 8/2006 | Hansen et al. | 370/208 |
| 2006/0198343 | A1* | 9/2006 | Goldberg | 370/335 |
| 2006/0222095 | A1 | 10/2006 | Niu et al. | 375/260 |
| 2007/0004352 | A1 | 1/2007 | Waxman | 455/134 |
| 2007/0019750 | A1* | 1/2007 | Gaikwad et al. | 375/260 |
| 2007/0049229 | A1 | 3/2007 | Finkelstein et al. | 455/270 |
| 2008/0037682 | A1* | 2/2008 | Tsai et al. | 375/267 |
| 2009/0003483 | A1* | 1/2009 | Farhang-Boroujeny et al. | 375/262 |

OTHER PUBLICATIONS

Detection of preamble of random access burst in W-CDMA system; Zakharov, Y.V.; Adlard, J.F.; Tozer, T.C.; Personal, Indoor and Mobile Radio Communications, 2000. PIMRC 2000. The 11th IEEE International Symposium on Volume: 1 Digital Object Identifier: 10.1109/PIMRC.2000.881395 Publication Year: 2000, pp. 82-86 vol. 1.*

A final office action for U.S. Appl. No. 10/698,703 mailed Aug. 29, 2008.

IEEE draft Standard P802.11N (D1), Mar. 2006. Draft Standard for Information Technology—Telecommunications and information exchange between systems—Local and metropolitan area networks—Specific requirements—Part 11: Wireless LAN Medium Access Control (MAC) and Physical Layer (PHY) specifications: Amendment : Enhancements for Higher Throughput. IEEE 802.11n/D1.0 (Draft 1.0), Mar. 2006. (Separated into 2 parts due to file size constraints.).

IEEE draft Standard P802.11N (D2) 2007, Draft Standard for Information Technology—Telecommunications and information exchange between systems—Local and metropolitan area networks—Specific requirements—Part 11: Wireless LAN Medium Access Control (MAC) and Physical Layer (PHY) specifications: Amendment : Enhancements for Higher Throughput. ISBN: 0-7381-5568-3, available from IEEE, New York, and for download at <www.IEEE.org>.(Separated into 3 parts due to file size constraints.).

Il-Gu Lee; Jungbo Son; Eunyoung Choi; Sok-Kyu Lee: "Fast automatic gain control employing two compensation loop for high throughput MIMO-OFDM receivers," *Proceedings. 2006 IEEE International Symposium on* Circuits and Systems, 2006. ISCAS 2006, May 21-24, 2006.

* cited by examiner

START OF PACKET DETECTION FOR MULTIPLE RECEIVER COMBINING AND MULTIPLE INPUT MULTIPLE OUTPUT RADIO RECEIVERS

RELATED PATENT APPLICATIONS

The present invention claims priority of U.S. Provisional Applications Ser. Nos. 60/804,069 filed Jun. 6, 2006 and 60/803,964 filed Jun. 5, 2006. The contents of such Provisional Patent Applications 60/804,069 and 60/803,964 are incorporated herein by reference.

The present invention also claims priority of, and is a continuation-in-part of commonly assigned U.S. patent application Ser. No. 10/698,703 filed Oct. 31, 2003 now U.S. Pat. No. 7,480,234 to Hart, et al., and titled INITIAL TIMING ESTIMATION IN AN WIRELESS NETWORK RECEIVER, The contents of patent application Ser. No. 10/698,703 are incorporated herein by reference.

FIELD OF THE INVENTION

The present disclosure is related to packetized wireless networks.

BACKGROUND

The present invention is related to packetized wireless networks, and in particular to a method and apparatus for detecting the start of packet (SOP) in a wireless receiver for operation in a packetized wireless network, wherein the wireless receiver includes a plurality of antennas each having and included in a respective receive chain.

Start of Packet Detection has been an important problem in packetized wireless networks for some time. When designing a wireless packet structure, a preamble (a set of one or more training fields) is usually included. It is preferred that such a preamble be as short as possible to minimize overhead, that is, to devote as much of the packet's bits to data payload. There is therefore a need for methods that can quickly detect the start of a packet that has a short preamble. Note that once the start of packet is detected, there is a need to carry out automatic gain control, timing synchronization, frequency synchronization, and channel estimation before the data payload can be properly processed. This makes it even more important to rapidly detect the start of packet. As a result, in many of today's packetized wireless networks, the maximum range possible with a receiver is often determined more by the ability to rapidly detect the start of packet than the ability to demodulate the encoded data.

What are therefore needed are robust methods for detecting the start of packet transmission.

Start-of-Packet (SOP) detection methods are known, e.g., applicable to wireless local area networks (WLANs) that conform to one of the IEEE 802.11 standards. Commonly assigned U.S. Pat. No. 7,151,759 to Ryan et al., and titled AUTOMATIC GAIN CONTROL AND LOW-POWER START-OF-PACKET DETECTION FOR A WIRELESS LAN RECEIVER describes a SOP detector and a detection method based on RSSI. The contents of U.S. Pat. No. 7,151,759 are incorporated herein by reference.

Commonly assigned U.S. patent application Ser. No. 10/629,383 file Jul. 28, 2003 to Keaney, et al., and titled EARLY DETECTION OF FALSE START-OF-PACKET TRIGGERS IN A WIRELESS NETWORK NODE describes a SOP detector that works together with checking one or more reserved bit locations in a receiver to rapidly ascertain if the SOP provided a false trigger. The contents of patent application Ser. No. 10/629,383 are also incorporated herein by reference.

Above-referenced, related, incorporated herein by reference, and commonly assigned U.S. patent application Ser. No. 10/698,703 filed Oct. 31, 2003 to Hart, et al., and titled INITIAL TIMING ESTIMATION IN AN WIRELESS NETWORK RECEIVER describes a SOP detector that works together with estimating the initial timing.

The SOP detection methods disclosed in each of the above patent applications are applicable to single-input-single-output (SISO) receivers, e.g., receivers arranged for receiving signals that conform to one of the IEEE 802.11 SISO standards, such as IEEE 802.11a, b, and g.

Recently, multiple transceiver receivers such as for operation as multiple-receiver-combining (MRC) wireless nodes and for multiple-input, multiple-output (MIMO) wireless nodes have become more widely available, and there is, for example a draft standard, IEEE 802.11n applicable to wireless local area networks (WLANS) that use MIMO signals. Such MIMO signals have some properties that are different from SISO signals. For example, the present MIMO standard signals include cyclic delay diversity at the beginning of the transmitted packet. This can make detecting the SOP slightly more difficult than in the SISO case.

Thus there is a need for SOP detection methods that work rapidly, and that work well in multi-receiver nodes such as MIMO and MRC nodes.

SUMMARY

Described herein are a method and an apparatus for detecting the start-of-packet in a wireless receiver operating in a packetized wireless network.

One embodiment includes a method comprising receiving a respective signal in each of a plurality of receive chains of a receiver of a wireless network. The received signals potentially correspond to a wireless transmission of a packet from a transmitting station of the wireless network, the packet having a preamble and a data part. The method includes calculating a plurality of start of packet (SOP) indicators, each for one or more of the receive chains; determining one or more linear combinations of respective pluralities of the calculated SOP indicators to form one or more combined SOP indicators; comparing each of a plurality of SOP indicators or combined SOP indicators, including at least one of the combined SOP indicators to a respective threshold to form one or more respective SOP events; and, in the case there is more than one SOP event, determining a logic function of the SOP events to form a SOP decision event.

In one embodiment, the plurality of SOP indicators include two or more of:
- for each receive chain, the average received signal power;
- for each receive chain, the average power rise of the received signal for the receive chain;
- for each receive chain, at least one measure of the quality of the correlation of the input signal with a known part of the preamble;
- for each receive chain, at least one measure of the normalized autocorrelation of one or more sections of a known part of the preamble;
- a weighted sum across all receive chains of the average received signal powers;
- a weighted sum across all receive chains of the average power rise of the received signal;

a weighted sum across all receive chains of measures of the quality of the correlation of the input signal with a known part of the preamble;

a weighted sum across all receive chains at least one measure of the normalized autocorrelation of one or more sections of a known part of the preamble.

At least one of the SOP indicators that are weighted sums are included in the plurality of SOP indicators.

One embodiment includes an apparatus in a receiver of a wireless network. The apparatus comprises: a plurality of receive chains each including an antenna and configured to receive a respective signal potentially corresponding to a wireless transmission of a packet from a transmitting station of the wireless network, the packet having a preamble and a data part; calculating subsystems coupled to receive chains, each calculating subsystem operative to calculate a start of packet (SOP) indicator for one or more of the receive chains; a summer subsystem coupled to the calculating subsystems, and operative to determine one or more linear combinations of respective pluralities of the calculated SOP indicators to form one or more combined SOP indicators; one or more comparator subsystems coupled to the summer subsystem and operative to compare each of a plurality of SOP indicators or combined SOP indicators, including at least one of the combined SOP indicators to a respective threshold to form one or more respective SOP events; and a logic circuit coupled to the outputs of the comparator subsystems and operative to determining a logic function of the SOP events to form a SOP decision event.

One embodiment includes an apparatus in a receiver of a wireless network. The apparatus comprises: a plurality of means for receiving a signal potentially corresponding to a wireless transmission of a packet from a transmitting station of the wireless network, the packet having a preamble and a data part; a plurality of means for calculating a respective plurality of start of packet (SOP) indicators, each for one or more of the receive means; means for determining one or more linear combinations of respective pluralities of the calculated SOP indicators to form one or more combined SOP indicators; means for comparing each of a plurality of SOP indicators or combined SOP indicators, including at least one of the combined SOP indicators to a respective threshold to form one or more respective SOP events; and means for determining a logic function of the SOP events to form a SOP decision event.

Particular embodiments may provide all, some, or none of these aspects, features, or advantages. Particular embodiments may provide one or more other aspects, features, or advantages, one or more of which may be readily apparent to a person skilled in the art from the figures, descriptions, and claims herein.

DETAILED DESCRIPTION

The present invention described methods and apparatuses for detecting the start of a packet (SOP) in receiver operable in a packet based wireless network. The SOP detection includes determining of SOP indicators. Some SOP indicators apply for single input single output receiver. For multiple-receiver structures that includes a plurality of antennas, each having and included in a respective receive chain, such as MIMO and MRC receivers, these SOP indicators are, in one embodiment, calculated for each receive antenna via each respective receive chain.

The invention will be described herein in terms of a WLAN station that operated according to OFDM variants of the IEEE 802.11 standard and proposed amendments, including combined OFDM and DSSS/CCK variants. One receiver embodiment supports the IEEE 802.11b,g combined OFDM and DSSS/CCK and 11a OFDM variants operating in the 2.4 GHz and 5 GHz frequency ranges, respectively. Another operated according to the IEEE 802.11n draft standard for MIMO. The IEEE 802.11n draft standard is available for purchase from the IEEE at standards.IEEE.org. The invention is also applicable to a radio that operates under other wireless standard for which accurate timing determination is important, including other variants of the IEEE 802.11 standard.

A Receiver Architecture

Figure 1A:
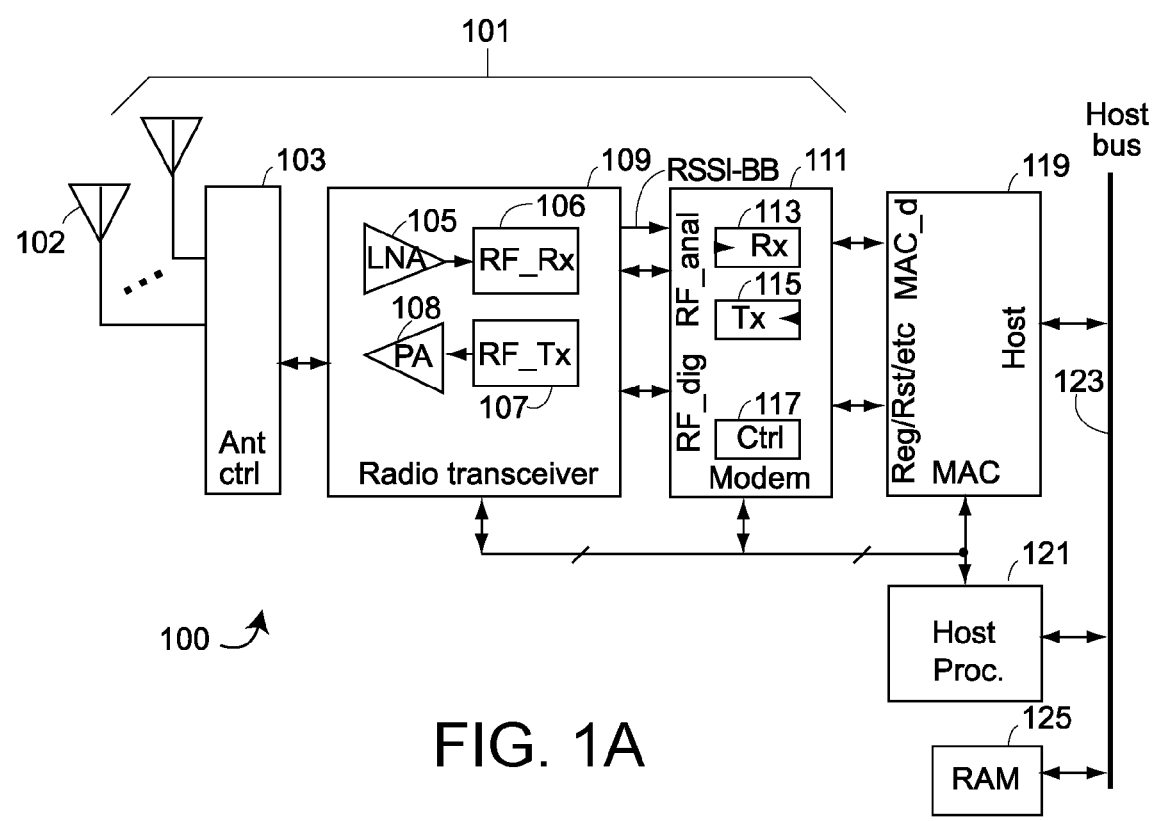
FIG. 1A shows a simplified block diagram of a single input single output (SISO) wireless node that includes a SISO apparatus embodying aspects of the invention.

FIG. 1A is a functional block diagram of an exemplary single input single output (SISO) wireless network node 100 that includes an embodiment of present invention. Such an embodiment 100 includes a radio receiver to receive a signal and output a receive signal. The node 100 might be, for example, implemented on a PCMCIA wireless LAN card, or as an access point (AP), and includes a physical layer interface (PHY processor) 101 that includes an antenna subsystem 102 with at least one antenna for the frequency or frequencies of service (approx. 2.4 GHz and/or approx. 5 GHz), and an antenna subsystem 103 that for the case of half-duplex operation includes a transmit/receive (T/R) switch, and for the case of diversity, includes a diversity switch to select an antenna. The antenna subsystem is coupled to a radio receiver and a radio transmitter (together a transceiver 109) that in one embodiment is implemented as a single chip. The radio receiver of the transceiver includes a low-noise amplifier (LNA) 105 and receive radio frequency (RF) electronics 106. The radio transmitter part of the transceiver 109 includes transmit RF electronics 107 and a power amplifier (PA) 108. The transceiver provides an analog received signal to and accepts an analog signal for transmission from a modem 111 that includes a receiver signal chain 113, a transmitter signal chain 115, and a control part 117. The receiver signal chain 113 includes start of packet (SOP) detection, automatic gain control, and timing estimation. The receiver signal chain 113 further includes the receive processing of the received data once SOP is detected, gains adjusted, and initial timing determined. The modem is coupled to the radio transceiver via an RF analog interface for the received signal and signal for transmission, and via an RF digital interface for such control signals as gain control and status.

One embodiment of the radio receiver uses a superheterodyne architecture with an intermediate frequency (IF) stage that includes an IF filter. The radio receiver provides a pair of received signal strength indication (RSSI) signals. One RSSI signal is the common RSSI signal post IF filter, e.g., at the end of the analog receiver, called RSSI-BB herein, and the other is pre-IF filtering, called RSSI-IF herein. These are used for automatic gain control (AGC). The RSSI-BB signal's exceeding a threshold is further used as one of the SOP detection criteria.

The SISO node 100 further includes a medium access controller (MAC) processor 119 for layer-2 processing. The MAC processor accepts payload data from the modem, and provides payload data to the modem 111 via a data interface. The MAC processor further is connected to the modem 111 via a digital interface that provides access to the MAC processor of various status and data registers in the modem 111.

In one embodiment, the MAC processor is coupled to a host processor 121 via a host bus subsystem 123. While FIG. 1A shows a separate host processor, the host processor function may in other embodiments be incorporated with the MAC processor 119. In one embodiment, a memory, e.g., a random access memory element (RAM) 125 is included for program storage. The memory 125 may be directly coupled to the host or to the MAC processor or to both. There may also be additional memory, e.g., for buffering, and for simplicity, such additional memory will be assumed to be included in memory 125. One or more interfaces may be included, e.g., one or more interfaces that conform to well-known industry standards PCMCIA, PCI, USB, and so forth.

Some SISO embodiments may use antenna diversity, e.g., two or more transmit antennas or two or more receive antennas or multiple antennas for both receiving and transmitting. The diversity may be provided by spatial diversity, or by having different polarizations at the antennas, and so forth. The antennas may be switched or combined.

One embodiment of system 100 is compatible with one or more variants of the IEEE 802.11 standards for wireless local area network (LAN) applications. The RF transceiver 109 and modem 111 constitute a complete wireless engine for OSI Layer-1 physical layer (PHY) functionality for one or more of the IEEE 802.11 PHY variants, and the (MAC) 119 is substantially IEEE 802.11 compatible.

Figure 1B:
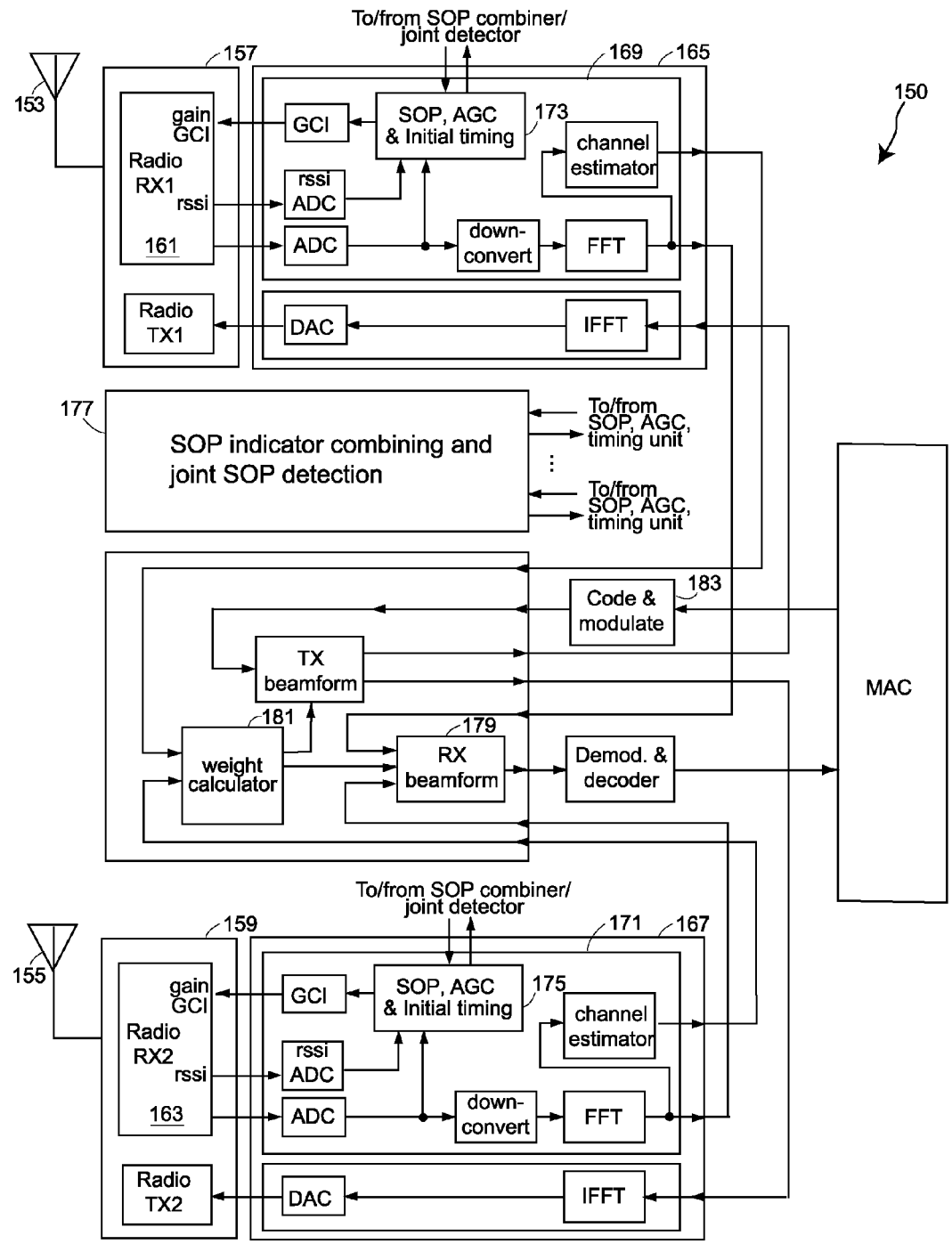
FIG. 1B shows a simplified block diagram of an exemplary multiple transceiver wireless node that includes a multiple receiver apparatus embodying aspects of the invention, e.g., one suitable for a multiple input multiple output (MIMO) system.

FIG. 1B is a block diagram of a multiple radio wireless node 150 that includes multiple radio transceivers. Two transceivers are shown in FIG. 1B. One version of the node 150 of FIG. 1B is used for multiple input multiple output (MIMO) communication, while another version is used, in the receive mode, as a multiple-receiver-combining (MRC) receiver. Such a receiver includes multiple antennas each having and included in a respective receive chain. The receive chain outputs are combined-hence the term multiple receiver combining, to achieve, for example, smart antenna adaptive processing.

In the two transceiver version, the wireless node 150 includes a first antenna 153 and a second antenna 155 coupled to a first radio transceiver 157 and a second radio transceiver 159. The first and second radio transceivers 157, 159 each include a radio receiver 161, 163, respectively, and a radio transmitter, respectively. The first and second radio transceivers are coupled to respective digital circuits 165 and 167. Each digital circuit 161, 167 respectively includes a receive digital chain 169, 171 and a transmit digital chain. Each receive digital chain 169, 171 is part of a respective receive chain that includes the antenna when receiving, and accepts low IF signals from the respective radio receiver 161, 163 that are in the respective analog parts of the respective receive chains, and digitizes the signals using a respective ADC. The digital samples from the respective ADC are accepted by a respective start of packet (SOP), automatic gain control (AGC) and initial timing subsystem 173, 175 that include aspects of the present invention. The respective radio receiver 161, 163 also provides a RSSI signal to the respective digital receive chains 169, 171, and the RSSI signal from the respective radio receiver 161, 163 is digitized by a respective RSSI ADC to provide RSSI signal samples to the respective SOP, AGC and initial timing subsystem 173, 175. Each respective SOP, AGC and initial timing subsystem determines one or more start of packet metrics that are combined in a SOP indicator combining and joint SOP detection unit 177, and also sets the gains of each radio receiver 161, 163 via a gain control interface (GCI). Each respective SOP, AGC and initial timing subsystems 173, 175 together with the SOP indicator combining and joint SOP detection unit 177 also determines the initial timing of the signal.

The digital samples from each respective ADC are downconverted to produce baseband samples using a downconverter in each digital receive chain 169, 171. For OFDM signals conforming to an OFDM variant of the IEEE 802.11 standard, the downconverted signals are converted to modulated tones by a respective fast Fourier transform (FFT) unit. Each packet conforming to an OFDM variant of the IEEE 802.11 standard includes symbols of known subcarriers in the preamble. Each digital receive chain 169, 171 includes a respective channel estimator accepting the output of the respective FFT unit during reception of the known symbols and determines the channel response for each tone for each antenna's receive chain so far.

The wireless node 150 also includes a combining subsystem-in this case a beamforming subsystem 179 that for reception includes a weight calculator 181 that accepts the respective outputs of the channel estimators for each antennas' receiver. The weight calculator in one embodiment calculates complex valued receive weights that are accepted by a receive beamformer 179. The receive beamformer 179 accepts the outputs of the respective FFT units and forms a weighted signal for demodulation and decoding. A demodulator (demod.) and decoder subsystem 183 carries out the demodulation, de-interleaving, de-puncturing and de-scrambling to form the digital data for a received packet. The output of the demodulator and decoder subsystem 183 is accepted by a MAC processor.

In one embodiment, one of the digital receive chains, e.g., digital receive chain 169 acts as a master to the second digital receive chain 171 in that the timing in the two digital receive chains are synchronized, with the digital receive chain 169 determining the timing for both.

On the downlink, information from the MAC is accepted by a coder and modulator that scrambles and encodes the data, in the case of OFDM that punctures and interleaves the coded data, and modulates the data to form modulated symbols for each tone of a to-be-transmitted OFDM signal. Pilot tones are combined to form a complete set of tones. The complete set of tones are accepted by a transmit beamformer that also accepts transmit weights from the weight calculator 181 to generate two tone-sets, one for each transmit-chain to be transmitted by each of antennas 153 and 155.

The two tone-sets from the transmit beamformer are input to the first and second digital transmit paths. Each digital transmit chain includes, for OFDM signals, a respective inverse FFT (IFFT) unit to convert the tone sets to time-domain to-be-transmitted digital signals. Each digital transmit chain includes a respective mechanism (not shown in this drawing) to add cyclic extension to the data corresponding to each OFDM signal and a mechanism, also not shown in FIG. 4 to form a respective packet by adding a preamble to the respective data. The complete digital data for each packet is converted to analog data by a respective DAC to generated I,Q data for the respective radio transmitter of the respective transceiver 159, 159. The respective radio transmitter transmits the packet via the first antenna 153 and second antenna 155, respectively.

The Packet Structure

In one embodiment, a packet according the wireless networking standard includes a training part and a modulated part. The training part has a first part (called the short training field herein) that includes a series of periodic symbols and a second training field.

Figure 2A:
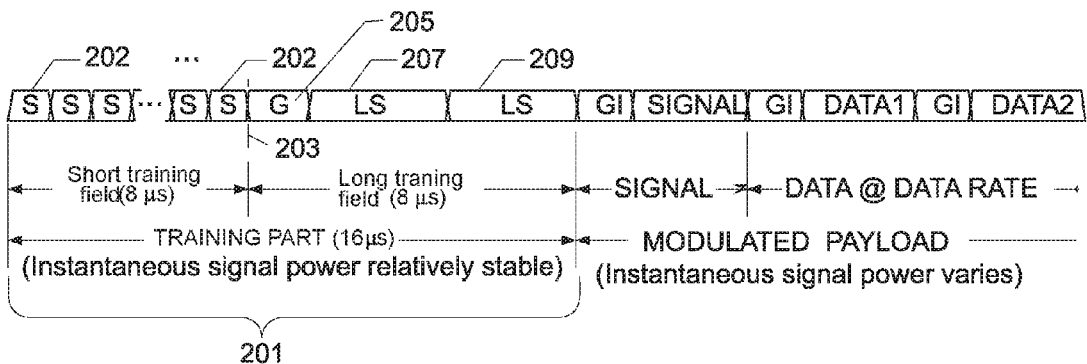
FIG. 2A shows a typical OFDM packet that conforms to the IEEE 802.11a standard and that includes a preamble with a short training field and a long training field that precede a SIGNAL field and the data payload.

One embodiment of the invention is applicable to communicating using OFDM packets that conform to the OFDM SISO variants of the IEEE 802.11 standard. FIG. 2A shows the structure of an OFDM packet as used in IEEE 802.11a WLANs. The packet starts with a training part 201 used for SOP detection, AGC, diversity selection when diversity is used, and various other synchronization functions, including initial timing estimation as described herein. The training part is followed by the modulated payload, which starts with a known (low) data rate SIGNAL field and DATA fields. Each data field includes a guard interval (cyclic extension).

The training part 201 includes two 8 μs parts: a first part ("short training field," "STF") consisting of set of 10 short symbols 202, and a second part ("long training field," "LTF") includes two long symbols 207 and 209, and a cyclic extension part (guard interval) 205. In a typical system, the short training field provides for the SOP detection, AGC, diversity selection when diversity is used, coarse frequency offset estimation and timing synchronization, while the long training field then provides for channel estimation and fine frequency offset estimation.

The short symbols only use 12 subcarriers, while the long symbols have energy in all 52 subcarriers used in the OFDM signals.

In order to provide enough time for further preamble processing, SOP detection needs to be detected within about 2 μs, i.e., within 3 or so short symbols into the short training field. The initial timing (also called exact SOP time) also needs to be determined, but can be determined later than the detection of the SOP.

Those in the art will understand that variants of the IEEE standard, including for example, the draft IEEE 802.11n standard, have slightly different preamble structures, that include additional elements that deal with multiple receive path, e.g., MRC or MIMO features.

Figure 2B:
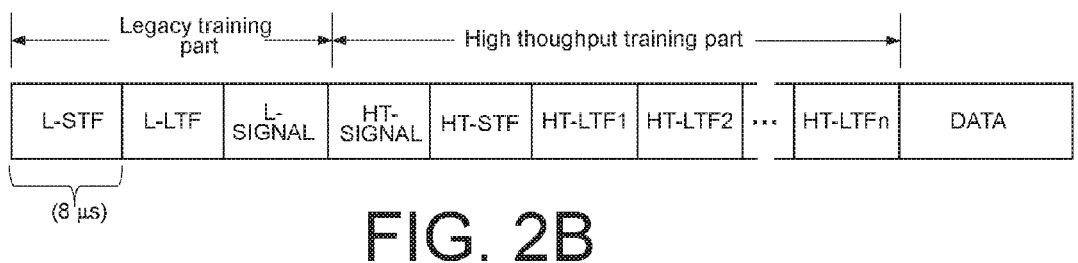
FIG. 2B shows a typical OFDM packet that conforms to the IEEE 802.11a standard and that includes a preamble with a short training field and a long training field that precede a SIGNAL field and the data payload.

One such preamble structure is for Mixed mode operation. In this mode, both the MIMO-OFDM systems and SISO-OFDM systems can co-exist: A MIMO system can have the capability to generate SISO-OFDM packets ("legacy") packets older "legacy" systems and MIMO packets for MIMO-OFDM systems. FIG. 2B shows a simple representation of a mixed-mode packet that includes a legacy preamble part, a high throughput preamble part and the data part. For compatibility, a mixed mode packet includes a training part ("legacy training part" that conforms to the training part of the packet shown in FIG. 2A, including the short training field (L-STF), long training field (L-LTF) and SIGNAL field (L-SIGNAL). The packet also includes a high throughput preamble (high throughput training part) that includes a high throughput signal part denoted HT-SIG, a high throughout short training field, denoted HT-STF, and a number of high throughput long training fields (H-LTFs). This if followed b the data field. The HT-SIG field occupies 8 μs and it is used to carry the information required to interpret the data coming in the data part, including the number of high throughput long training fields (H-LTFs). The HT-STF field has duration is 4 μs with the frequency response of the signal in this field identical to the legacy short symbol field. It is typically used for getting better Automatic gain control (AGC) in a multi transmits and multi receive system. The high throughput short training field of the packet is followed by the HT-LTF. Each field is of 4 μs duration and the number of HT-LTFs in the preamble is decided by the antenna configuration and the presence of space time codes. The number of HT-LTF is equal to greater than the number of spatial streams. This field is useful in estimating the channel impulse response for each of the spatial stream path. So, for a 2×2 MIMO configuration, two HT-LTFs are transmitted. Similarly, for a 2×3 MIMO configuration where space time codes are used for exploiting diversity, three HT-LTFs are transmitted. Finally the data field is transmitted.

Another such preamble structure is the Green field mode operation. This mode is similar to mixed mode where the transmission happens only between the MIMO-OFDM systems in the presence of legacy receivers. However, the MIMO-OFDM packets transmitted in this mode have only MIMO specific preambles and no legacy format preambles are present. Thus there is no protection for the MIMO-OFDM systems from the legacy systems. No transmissions are intended to the legacy and mixed mode systems from the green field system. The MIMO-OFDM receivers should be able to decode the green field mode packets as well as legacy format packets.

Figure 2C:
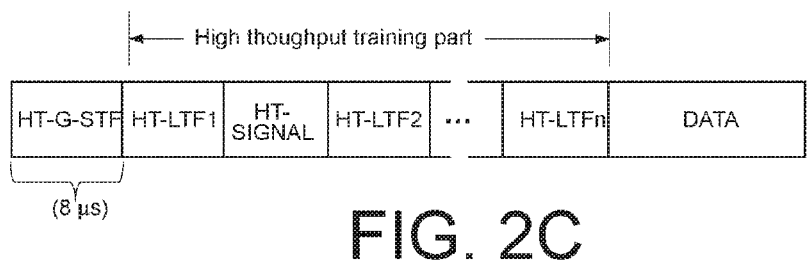
FIG. 2C shows a typical OFDM packet that conforms to the IEEE 802.11a standard and that includes a preamble with a short training field and a long training field that precede a SIGNAL field and the data payload.

FIG. 2C shows the structure of a packet for Green field mode. The packet has a high-throughput Greenfield short training field (HT-G-STF) which, like the legacy short training field of FIG. 2A, includes ten repeated waveforms, each 0.8 μs long for a length of 8 μs. The equations for each of the waveforms in described in the draft IEEE 802.11n standard. The remainder of the packet includes a high throughput preamble part and the data part. The high throughput preamble part includes HT-LTF fields and HT-SIG. The first HT-LTF is of 8 μs and the remaining HT-LTFs are of 4 μs. The purpose and the number of HT-LTFs is very similar to those discussed above for the mixed mode packet structure of FIG. 2B. The last field is the data field.

In the remainder of the description, for the purpose of start of packet detection, and initial timing, the structure of FIG. 2A is used. One embodiment that conforms to the IEEE 802.11n draft standard uses short training field structure of the IEEE 802.11n modes that is either substantially the same structure for start of packet detection, and initial timing determination, or that is described in the standard to a level so that the description herein is sufficient to enable implementation. For example, in the case of Greenfield mode, the HT-G-STF has 10 repetitions of a waveform that is different to that in the L-STF, but well described in the draft standard, so that those in the art will understand how to modify the description for start of packet detection for different packet types.

Figure 3:
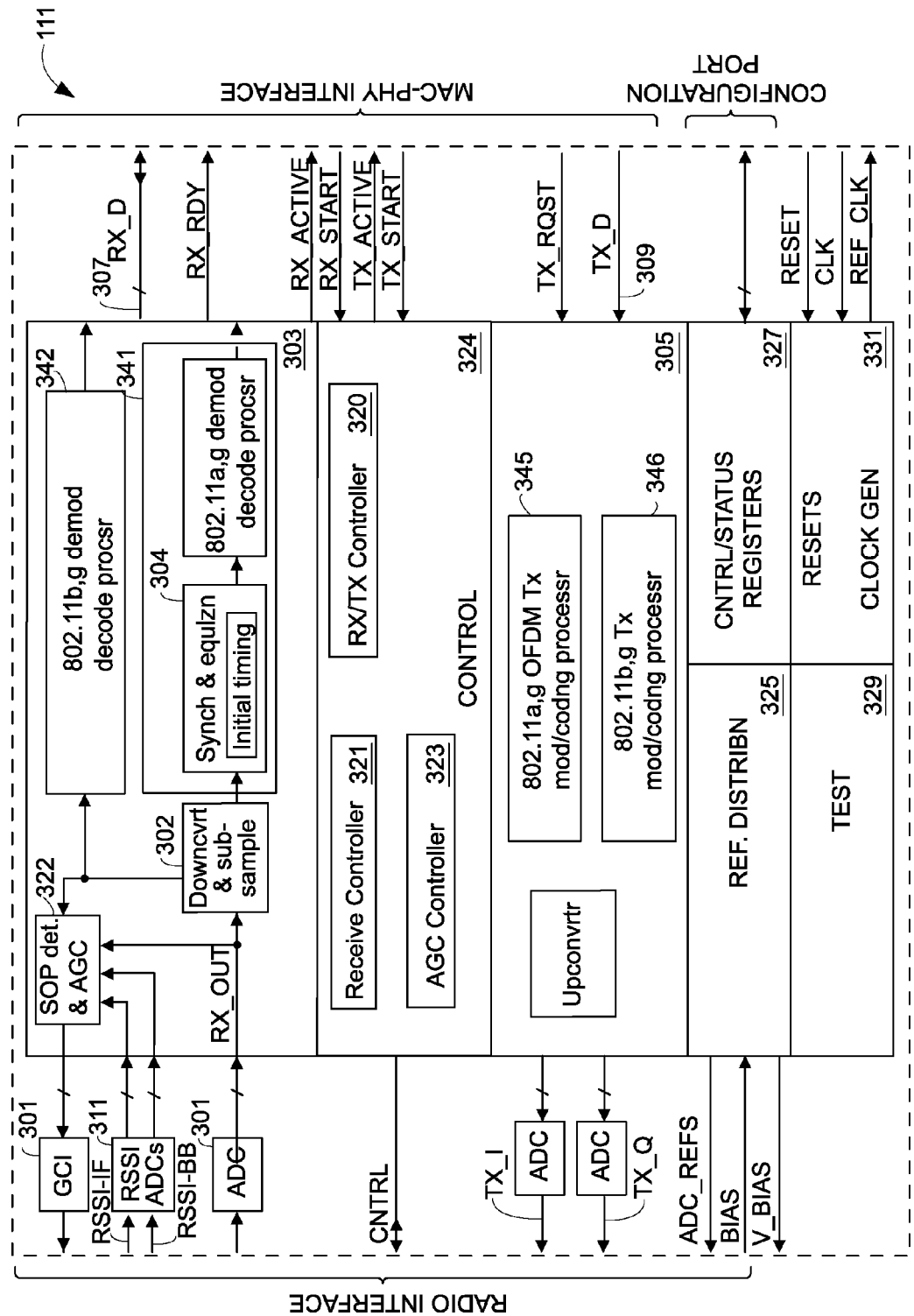
FIG. 3 shows the modem of the SISO wireless network node of FIG. 1A in more detail.

FIG. 3 shows an exemplary SISO that can be modem 111 of FIG. 1 in some detail. The architecture also is applicable to the receiver signals paths 169 and 171 of FIG. 1B, and those in the art will clearly be able to modify the system shown in FIG. 3 to be applicable to the multiple receiver system shown in FIG. 1B.

The exemplary modem 111 is implemented as a single chip and includes a controller 324 that controls the different states of the receiver (receive controller 321) the operation of the automatic gain control circuit (AGC controller 323), and receive/transmit control (Rx/Tx controller 320) for controlling the function of the modem under control of the off-chip MAC controller and that provides status signals to the off-chip MAC controller 119.

The modem accepts analog baseband signals. "Baseband" in this context includes low intermediate frequency signals that may need further digital downconversion. In one embodiment, the baseband signal is a low-IF signal from 10 to 30 MHz. An ADC 301 accepts the analog signal from a transceiver such as radio transceiver 109 and digitizes them at a sampling rate of 80 MHz. The receive signal processor 303 accepts the digitized receive signals from the ADC 301 and downconverts the signals in downconverter 302 to I, Q baseband signals. The downconverted baseband signals, subsampled to a 20 MHz sampling rate, are then subject to the signal processing operations needed to produce demodulated signals. The implementation shown includes an IEEE 802.11a compliant receive signal processor 341 and an 802.11b-compliant receive signal processor 342 to provide for processing signals that conform to the OFDM 802.11a or 802.11g variants of the IEEE 802.11 standard, and to the DSSS/CCK 802.11b,g variant of the IEEE 802.11 standard. The combination of receive signal processors 341 and 342 provide an IEEE 802.11g-compliant receive processor. The processed data output 307 from the receive signal processor 303 is coupled to an off-chip MAC processor such as MAC processor 119, generating and passing the received data of a packet to the MAC processor 119. In one embodiment, additional information also is passed on to the MAC layer processor, including information about the packet. Status information also is provided to the MAC processor via registers 327 in the modem 111.

The OFDM receive signal processor 341 includes a synchronization and equalization processor 304 that carries out synchronization and equalization, including carrying out an FFT operation to determine the subcarriers, and including carrying out initial timing determination, according to aspects of the present invention, to provide for the initial timing for the FFT operation.

A to-be-transmitted signal 309 from the MAC processor 119 is input to a transmit signal processor 305 that performs modulation and other signal processing to provide digital I- and Q-signals that are converted to analog I- and Q-signals by a pair of digital-to-analog converters. These analog signals are input to the transmitter input of the transceiver 109. The transmit signal processor 305 includes an IEEE 802.11a,g-compliant transmit signal processor 345 and an 802.11b,g-compliant transmit signal processor 346.

In one embodiment, operation of the modem 111 is controlled and monitored by a set of control and status registers 327 that, in one embodiment, are 16-bits each and accessed via Serial Peripheral Interface (modem SPI), or in another embodiment, a parallel bus.

The receiver part of the modem is controlled by the control block 324 that includes a receive controller 321 for controlling the different states of the receiver part, and an automatic gain control (AGC) controller 323 for dynamically setting the gains to maximize the performance of the transceiver.

The receive signal processor 303 includes a start-of-packet (SOP) detector/and AGC circuit 322 that includes aspects of the present invention, and that operates in one embodiment under control of the receive and AGC controllers 321 and 323. The SOP detector and AGC controller 322 accepts the received low-IF signal, downconverted I,Q signals, and received signal strength indication signals from a pair of ADCs 311 to convert analog RSSI values (RSSI-IF and RSSI-BB) from different parts of the receive chain 106 of transceiver 106. The SOP detector/AGC controller 322 also is coupled to the initial timing determining circuit that operates according to one or more aspects of the invention.

The modem 111 also includes a reference distribution subsection 325 to provide various reference currents and voltages to the converters, a test subsection 329, and a reset/clock generation subsystem 331.

The modem 111 also includes a modem gain control interface (GCI) that outputs gain parameters, e.g., in the form of sets of gain control bits to a matching gain control interface in a radio receiver such as that of transceiver 109.

In one embodiment, the modem gain control interface also provides a mechanism for controlling the transmit power level of a radio transmitter connected to the modem by selecting from one of a set of configurations for the power amplifier of the transmitter.

Operation of the Receive Chain

Operation of the receive chain is now described in more detail.

Initially, the AGC controller 323 controls SOP detector/ AGC circuit 322 to set a default gain and waits for a packet to arrive, as signaled by a start-of-packet (SOP) event detected by the SOP detector/AGC circuit 322. Operation of the SOP detector/AGC circuit 322 is described in more detail below.

The default gain setting initially sets the gains of each section to allow packets having a broad range of signal strengths to be detected reliably. Initially, the SOP detector/

AGC circuit 322 waits for a start event such as a threshold exceeded in one or more of the RSSI values to indicate a possible start of packet. Embodiments of the SOP detecting are described in more detail below. In the multiple receiver, e.g., MIMO case (see FIG. 1B), the SOP detection works by SOP indicators being generated by individual SOP indicator calculators in each receive chain's SOP, AGC, and initial timing units, together with the SOP indicator combiner and joint SOP detection subsystem 177.

Once the initial SOP event occurs, the AGC controller 323 sets the gains of the receive chain in the transceiver according to the RSSI values to maximize the signal-to-noise-and-distortion at the ADC output. A further AGC stage uses digitized signal values to further set the gain of the receiver.

Initial timing determination is now carried out to refine the start time. See above-referenced incorporated-by-reference U.S. patent application Ser. No. 10/698,703 titled INITIAL TIMING ESTIMATION IN AN WIRELESS NETWORK RECEIVER for more details on initial timing determination. Once the initial timing is determined, the modem 111 now continues to process the data part of the packet, starting the with PLCP header in the case of an OFDM packet. Timing may be adjusted during such processing, e.g., using pilots.

Operation of an embodiment of the AGC controller uses a finite state machine (FSM) and is described in more detail in U.S. patent application Ser. No. 10/622,175 filed Jul. 17, 2003 to inventors Adams, et al., titled "ADAPTIVE AGC IN A WIRELESS NETWORK RECEIVER." Such U.S. patent application Ser. No. 10/622,175 is incorporated herein by reference.

SOP Determination

The method of detecting the SOP, and the SOP detector part of SOP detector/AGC circuit 322 for the single receiver case (FIG. 1A) and the multiple receiver case (FIG. 1B) are now described in more detail. The detecting from the received signal uses at least one SOP detection criterion. Depending on the SOP detection method, in the IEEE 802.11 case, the SOP event nominally occurs within the first 1.6 μs of an OFDM packet.

In the following, in the single receiver case, a respective signal is received in the receive chain, and in the multiple receiver case (MIMO or MRC), a respective signal is received in each of a plurality of receive chains of a receiver of a wireless network. The received signal(s) potentially correspond(s) to a wireless transmission from a transmitting station of the wireless network.

In some embodiments, a start of packet detection method is split into two distinct steps:
 1. Calculation of start of packet (SOP) indicators each for one or more of the receive chains.
 2. Determining one or more linear combinations of respective pluralities of the calculated SOP indicators to form one or more combined SOP indicators.
 3. Comparing each of a plurality of SOP indicators or combined SOP indicators, including at least one of the combined SOP indicators to a respective threshold to form one or more respective SOP events.
 4. In the case there is more than one SOP event, determining a logic function of the SOP events to form a SOP decision event.

Note that a linear combination of individual receive chain indicators may be defined as an SOP indicator, or as a combined SOP indicator.

One aspect of the invention is that some of the SOP indicators are determined differently for DSSS (802.11b) packets and for OFDM (802.11a,g) packets.

Embodiments of the invention use two of more of the following SOP indicators that we have found are useful for the start of packet detection:

1. One or more SOP indicators each based on a measure of a change in received signal strength or of a change in an average of the received signal strength. Such average signal strength is provided in one embodiment by averaging the digitized analog RSSI signal (RSSI-BB) provided via the RSSI-BB ADC 311 (see FIG. 3 for the SISO case). In another embodiment, the measure of the change in received signal strength is obtained from the receive signal power at baseband obtained from the analog input entering the modem's main ADC, e.g., ADC 301 in FIG. 3 for the SISO case, or similar receive chain ADC(s) for the MIMO case. The samples from the ADC are downconverted to baseband, filtered to the desired bandwidth, then subsampled. The magnitude squared is obtained, averaged using a moving average filter having a settable window length, and converted to a dB scale. In one embodiment, a window length of between 0.8 μs and 2.4 μs is used for OFDM packets, and a window length of between 1 μs and 2.4 μs is used for DSSS packets.

2. One or more SOP indicator SOP indicators based on a measure of the received signal strength, or of the average received signal strength as provided in one embodiment by the RSSI-BB signal, and in another embodiment, from samples from the main ADC, e.g., ADC 301 in FIG. 3 for the SISO case, or similar receive chain ADC(s) for the MIMO case.

3. One or more SOP indicators based on one or more measures of the quality of the correlation (the "correlation quality") of the input signal with a known part of the preamble, expressed in one embodiment as a measure of the magnitude of the normalized cross-correlation of the received waveform with a known transmitted waveform, or with a set of possible transmitted waveforms. In one embodiment, the measure of normalized correlation provides a plurality of indicators, each indicator including the normalized cross-correlation measure calculated over a different one of a plurality of integration times. The cross-correlation with a set of possible transmitted waveform is applicable, for example, for the case of packets conforming to the IEEE 802.11b standard. Such packets have a preamble that includes a Barker sequence repeating every symbol period. Each symbol is modulated by a scrambling sequence. In such a case, the set of waveforms for the cross correlation includes all possible modulations of the Barker sequence over one or more symbol periods. In one embodiment, for 802.11b packets, between 2 and 10 symbol periods are used, while for OFDM packets, 1 to 3 symbol periods are used. It should be noted that according the IEEE 802.11n draft standard, symbols use cyclic shift diversity, so such symbols transmit delayed cyclically delayed versions of the short symbols. In one 802.11n draft standard embodiment, the cyclic shift for the non-high-throughput (non-HT) portion of the packet is as shown in Table 1 below, where Tx means transmitter, and shift refers to cyclic shift.

TABLE 1

| No. of Tx Chains | Shift for Tx chain 1 | Shift for Tx chain 2 | Shift for Tx chain 3 | Shift for Tx chain 4 |
|---|---|---|---|---|
| 1 | 0 ns | — | — | — |
| 2 | 0 ns | 200 ns | — | — |
| 3 | 0 ns | −100 ns | −200 ns | — |
| 4 | 0 ns | −50 ns | −100 ns | −150 ns |

NOTE:
With more than four TX chains, each cyclic shift on the additional TX chains shall not be less than −200 ns nor greater than 0 ns.

For such an 802.11n embodiment, the correlation is with: the short symbol; a cyclically shifted version with an offset 200 of ns; and with a cyclically shifted version with an offset 100 ns. One embodiment includes forming the sum of the magnitudes of the correlation outputs.

4. One or more SOP indicators based on one or more normalized measures of the autocorrelation of the received waveform, e.g., the real part of the result of correlating the received waveform with a delayed version of itself. In one embodiment, this autocorrelation measure is normalized by the magnitude of the autocorrelation, plus unity in one version so that the result is strictly positive and so that a dB version can be meaningfully defined. As an example to illustrate, let $X1(t)$ denote input signal in a first receive chain, let $X1(t-T)$ denote the input signal in a second receive chain delayed by a period $T=0.8$ µs. Let Autocorr1 denote the normalized autocorrelation of the signal of Antenna 1. Let $$M1(t)=(\text{Abs}(X1(t)X1(t-T)^*)/(\text{Abs}(X1(t))(\text{Abs}(X1(t-T)))).$$ Then Autocorr1$(t)=M1(t)$ integrated over 0.8 usec.

The maximum value for Autocorr1(t) is then 1, i.e., 0 dB in a dB scale. The normalized autocorrelation measure also provide a set of indicators, each such indicator calculated over a different one of a plurality of delays and over a different one of a plurality of integration times to generate a set of indicators.

In one embodiment, forming the SOP decision event to detect an SOP includes using at least one of: detecting a threshold ("signal-power-threshold") being exceeded by the average received signal power, detecting a threshold being ("average-power-rise-threshold") exceeded by the average power rise of the received signal, and detecting a threshold ("correlation-quality-threshold") being exceeded by a measure of the quality of the correlation of the input signal with a known part of the preamble.

Some single criterion thresholds the inventors found useful include:

$RSSI_1 > -62$ dBm
$RSSI_2 > -62$ dBm;
$RSSI_3 .-62$ dBm;
$\Delta RSSI_1 > 3$ dB;
$\Delta RSSI_2 > 3$ dB;
$\Delta RSSI_3 > 3$ dB;
$Corr_1 > 3$ dB;
$Corr_2 > 3$ dB;
$Corr_3 > 3$ dB;
$Autcorr_1 > -1$ dB;
$Autocorr_2 > -1$ dB;
$Autocorr_3 > -1$ dB, wherein $RSSI_i$, $\Delta RSSI_i$, $Corr_i$, and $Corr_i$, i=1, 2, 3 denote the i'th received average signal strength, change in average received signal strength, correlation quality, and normalized measures of the autocorrelation SOP indicators, respectively, for a three-antenna embodiment.

One embodiment includes applying logical combinations of these SOP events, or linear combinations of these metrics. For example, $(RSSI_1 > -67$ dBm) AND $(RSSI_2 > -67$ dBm) AND $(RSST_3 > -67$ dBm);
$(\Delta RSSI_1 > 1$ dB) AND $(\Delta RSSI_2 > 1$dB) AND $(\Delta RSSI_3 > 1$ dB);
$(Corr_1 > 2$ dB) AND $(Corr_2 > 2$ dB) AND $(Corr_3 > 2$ dB);
(Autocorr1$>-3$ dB) AND (Autocorr2$>-3$ dB) AND (Autocorr3$>-3$ dB).

In alternate embodiments, one mix and match the RSSI, $\Delta$RSSI, Corr, and Autocorr SOP indicators and SOP events to provide even more decision rules.

In another version, another possible criterion is detecting a threshold ("weighted-sum-of-power-and-correlation-threshold") being exceeded by a weighted sum of the measure of the average received signal power and the measure of the correlation of the input signal with the known part of the preamble. Some such explicit criteria found useful include:

$RSSI_1 + \Delta RSSI_1 + Corr_1 + Autocorr_1 > -85$ dB;
$\Delta RSSI_1 + Corr_1 + Autocorr_1 > 5$ dB;
$\Delta RSSI_1 + Corr_1 + Autocorr_1 + \Delta RSSI_2 + Corr_2 + Autocorr_2 + \Delta RSSI_3 + Corr_3 + Autocorr_3 > 12$ dB.

In one embodiment a plurality of SOP events are determined for a plurality of packet types that are supported by the receiver. The SOP decision event to detect an SOP includes for each of the types of packets that are supported, e.g., for each of an OFDM 802.11a,g packet and a DSSS/CCK 802.11b,g packet, determining a logical function of a set of logical indicators—the SOP events—including for each type of packet: that a threshold was exceeded in the average received signal power, that a threshold was exceeded in the average power rise of the received signal, and that a threshold was exceeded in a measure of the quality of the correlation of the input signal with a known part of the preamble. In one version, the set of logical indicators further includes that a threshold was exceeded in a weighted sum of the measure of the average received signal power and the measure of the correlation of the input signal with the known part of the preamble.

Using DSSS to denote the result for an 802.11b type packet, and OFDM for an 802.11a or 802.11g OFDM packet, $TX_2MIMO$ and $TX_3MIMO$ for a second and third spatial channel MIMO packet, and GF for a Freenfield packet, again considering a three-receive-chain system, one example found useful is:

$DSSS\_Detect = \Delta RSSI_1 + Corr\_DSSS_1 + Autocorr\_DSSS_1 + \Delta RSSI_2 + Corr\_DSSS_2 + Autocorr\_DSSS_2 + \Delta RSSI_3 + Corr\_DSSS_3 + Autocorr\_DSSS_3 > 12$ dB $OFDM\_Detect = \Delta RSSI_1 + Corr\_OFDM_1 + Autocorr\_OFDM_1 + \Delta RSSI_2 + Corr\_OFDM_2 + Autocorr\_OFDM_2 + \Delta RSSI_3 + Corr\_OFDM_3 + Autocorr\_OFDM_3 > 12$ dB $TX_2MIMO\_Detect = \Delta RSSI_1 + Corr\_TX_2MIMO1 + Autocorr\_OFDM_1 + \Delta RSSI_2 + Corr\_TX_2MIMO_2 + Autocorr\_OFDM_2 + \Delta RSSI_3 + Corr\_TX_2MIMO_3 + Autocorr\_OFDM_3 > 12$ dB $TX_3MIMO\_Detect = \Delta RSSI_1 + Corr\_TX_3MIMO1 + Autocorr\_OFDM_1 + \Delta RSSI_2 + Corr\_TX_3MIMO_2 + Autocorr\_OFDM_2 + \Delta RSSI_3 + Corr\_TX_3MIMO_3 + Autocorr\_OFDM_3 > 12$ dB $GF\_Detect = \Delta RSSI_1 + Corr\_GF_1 + Autocorr\_OFDM_1 + \Delta RSSI_2 + Corr_1GF_2 + Autocorr\_OFDM_2 + \Delta RSSI_3 + Corr\_GF_3 + Autocorr\_OFDM_3 > 12$ dB SOPDetect=(DSSSDetect)OR(OFDMDetect)OR (TX2MIMODetect) OR(TX3MIMODetect)OR(GFDetect), where "Detect" is used to denote a respective SOP event, and SOPDetect is the SOP decision event.

One embodiment includes using an optional low-power circuit that detects a threshold being exceeded by the received signal power.

Figure 4A:
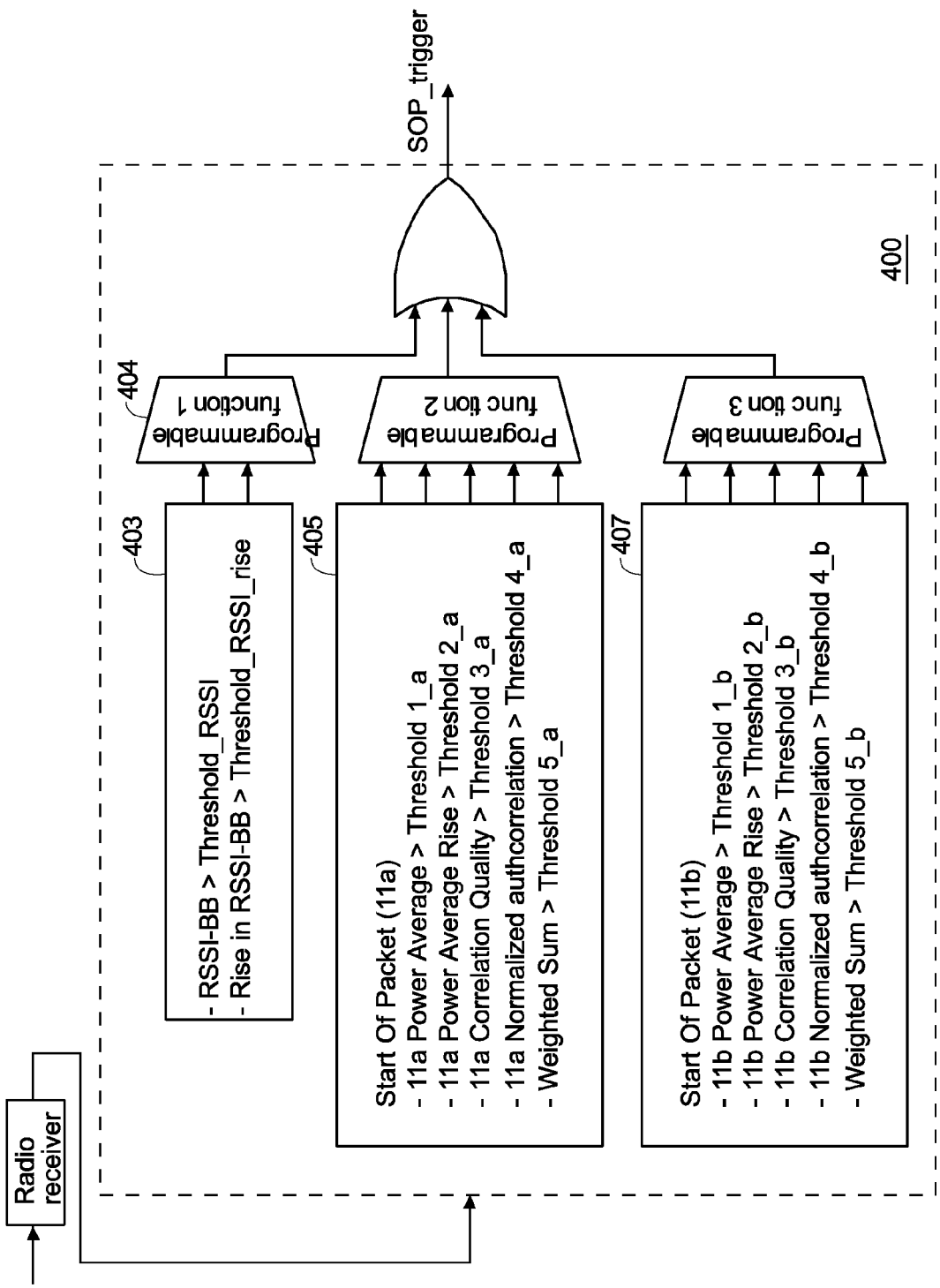
FIG. 4A shows an embodiment of start of packet (SOP) detector for a SISO receiver that is coupled to the radio receiver of the transceiver of FIG. 1A.

FIG. 4A shows one embodiment of an SOP detector 400 for an SISO receiver. The SOP detector 400 accepts inputs coupled to the radio receiver of the transceiver. The signals that are accepted by the SOP detector 400 include the digitized RSSI-BB values from the RSSI-BB ADC 311 of FIG. 3 for the SISO case, and the I,Q samples from the main ADC, e.g., ADC 301 in FIG. 3 for the SISO case, or similar ADC(s) for the MIMO case., but these are shown as single input from the radio receiver in FIG. 4A in order not to obscure the operation.

SOP detector 400 includes detection circuit 403 for detecting whether an average of the digitized analog RSSI signal RSSI-BB exceeds an RSSI threshold denoted RSSI_Threshold, and whether the rise in the average digitized analog RSSI signal RSSI-BB exceeds an RSSI-rise threshold denoted RSSI_Threshold_rise. In one embodiment, the average power rise is determined as a measure of the difference between the averaged RSSI-BB (in a logarithmic, e.g., dB scale) and a delayed average power measure (in the same logarithmic, e.g., dB scale). The delayed average power measure nominally estimates the quiescent noise power since it is assumed to occur before the start of packet.

In one embodiment, the RSSI-BB values are converted half dB values. In circuit 403, the average RSSI-BB and average RSSI-BB rise are each compared against programmable thresholds that can be stored in the register set of modem 111.

The logical results of comparing the two RSSI-BB SOP indicators against their respective programmable thresholds may be arbitrarily logically combined via a programmable function 404 implemented in one embodiment as a lookup table that can be stored in the register set of modem 111.

In use, the detection circuit 403 is used for a low power implementation. In other embodiments, the programmable function 404 is such that the detection circuit 403 is not used for SOP detection.

The SOP detector 400 further includes at least one detection circuit each generating a set of SOP indicators. A circuit is included for each of the type of packets that the receive processor supports. One embodiment of each circuit generates indicators indicating that a threshold was exceeded in the average received signal power; that a threshold was exceeded in the average power rise of the received signal; that a threshold was exceeded in a measure of the quality of the correlation of the input signal with a known part of the preamble; that a threshold was exceeded on the normalized autocorrelation of one or more sections of a known part of the preamble, and that a threshold was exceeded in a weighted sum of two or more of the SOP indicators. Other embodiments include a detection circuit generating fewer indicators.

The SOP indicators may be arbitrarily logically combined via a programmable function.

The SOP detector 400 includes one such detection circuit 405 that generates SOP indicators for detecting the SOP for a packet conforming to one of the OFDM variants of the IEEE 802.11 standard, and another detection circuit 407 to generate a set of SOP indicators for packets conforming to the IEEE 802.11b standard.

The thresholds are settable via the resister set of modem 111.

In one embodiment, the 11a SOP indicators all involve some form of averaging, and the averaging duration is set by a configuration register use__2sym_for_corr__11a of the set of registers of the modem 111. When use__2sym_for_corr__11a is de-asserted, the 11a SOP indicators use one short symbol duration (800 ns) of data or one short symbol with respect to one earlier short symbol. When use__2sym_for_corr__11a is asserted, the 11a SOP indicators use two short symbol durations of data or two short symbols with respect to two earlier short symbols. Note that we found that using two short symbols offers greater sensitivity but using one short symbol allows more time for more AGC loops or improved frequency estimation.

Figure 4B:
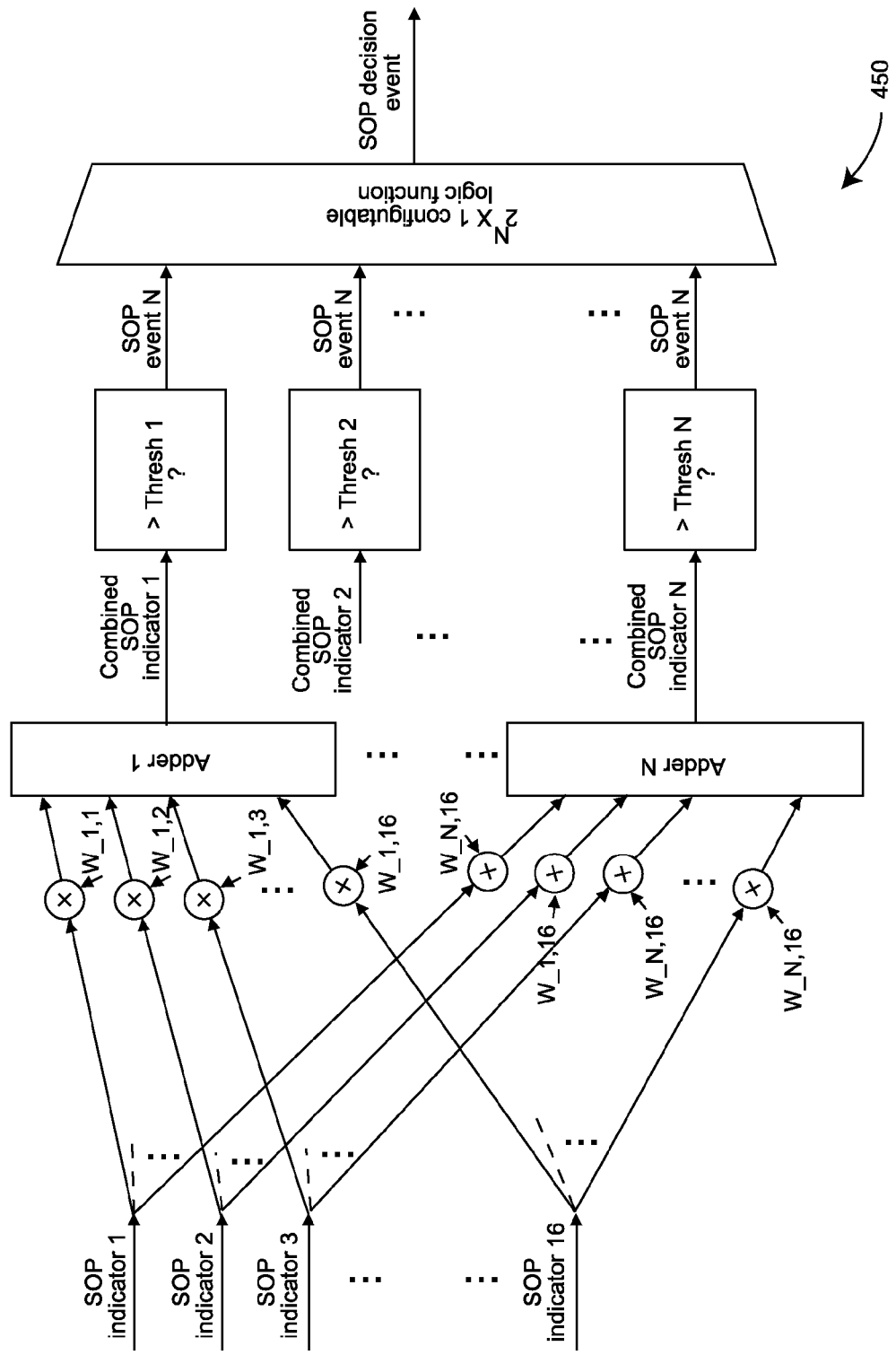
FIG. 4B shows an embodiment of configurable start of packet (SOP) detector for a multiple antenna/multiple receive chain receiver that is used, for example, in the receiver of FIG. 1B. A SISO version of the SOP detector of FIG. 4B also is usable in the receiver of FIG. 1A

FIG. 4B shows an embodiment of a SOP detector 450 for a multiple-antenna-multiple-receive-chain receiver such as one for MIMO or for MRC as shown in FIG. 1B. A set of SOP indicators is generated in each receive chain. In one embodiment, the indicators of each type are added for the different receive chains to provide a set of summed SOP indicators. In addition, a set of indicators for each antenna/receive chain is determined. Furthermore, in one embodiment, both sums of logarithmically scaled, e.g. dB converted SOP indicators, and a logarithmic-scale, e.g., dB conversion of the sum of SOP indicators prior to dB conversion are included.

FIG. 4B shows as input, by way of example, a number denoted M such summed and individual antenna/receive chain SOP indicators, including:

For each antenna and its receive chain, the average received signal powers.

For each antenna and its receive chain, the average power rise of the received signal for the receive chain.

For each antenna and its receive chain, at least one measures of the quality of the correlation of the input signal with a known part of the preamble.

For each antenna and its receive chain, at least one measure of the normalized autocorrelation of one or more sections of a known part of the preamble.

A weighted sum across all receive chains of the average received signal powers.

A weighted sum across all receive chains of the average power rise of the received signal for the antenna receive chains.

A weighted sum across all receive chains of one or more measures of the quality of the correlation of the input signal with a known part of the preamble. Note that there are many possible quantities for the correlation, e.g., Note we now have many different things to correlate. For example, DSSS Symbols; 802.11a/g OFDM symbols; 802.11n symbols with two transmit chains (for MIMO); 802.11n symbols with 3 transmit chains (for MIMO); 802.11n symbols with 4 transmit chains (for MIMO); 802.11n Greenfield (GF) symbols with two transmit chains (for MIMO); 802.11n GF symbols with 3 transmit chains (for MIMO); 802.11n GF symbols with 4 transmit chains (for MIMO); and so forth.

A weighted sum across all receive chains of one or more measures of the normalized autocorrelation of one or more sections of a known part of the preamble.

In one embodiment, only one delay and one integration time, and one correlation waveform for each type of packet is used. In another embodiment, the normalized autocorrelation measures provide a plurality of the M summed and a plurality of the individual SOP indicators, each such autocorrelation indicator calculated over a different one of a plurality of delays and over a different one of a plurality of multiple integration times. Similarly, for the summed and individual SOP indicators of the measure of normalized correlation, each such summed SOP indicator and individual SOP indicator is calculated over a different one of a plurality of integration times, and also for more than one waveform. As an example, these could include the following for the case of DSSS SOP indicators: Let $\text{Autoccorr}_A$=Absolute value of the correlation of $R(t)$ and $R(t-1\ \mu s)$ integrated over 1 $\mu s$; let $\text{Autocorr}_B$=Absolute value of $R(t)$ and $R(t-2\ \mu s)$ integrated over 1 $\mu s$; and let $\text{Autocorr}_C$: Absolute value of $R(t) R(t-3\ \mu s)$ integrated over 1 $\mu s$. One embodiment uses for the SOP event a linear combination of Autocorr1, Autocorr2, and Autocorr3. Another example, for 802.11 OFDM/MIMO, similar quantities, but with delays and integration times multiples of 0.8 $\mu s$.

Other embodiments include a detection circuit generating fewer indicators. As an example, for a three antenna example embodiment:

$RSSI_1+\Delta RSSI_1+Corr_1+Autocorr_1>-85$ dB;

$\Delta RSSI_1+Corr_1+Autocorr_1>_5$ dB;

$\Delta RSSI_1+Corr_1+Autocorr_1+\Delta RSSI_2+Corr_2+Autocorr_2+\Delta RSSI_3+Corr_3+Autocorr_3>12$ dB.

In one embodiment, a weighting factor is applied to each summed and individual SOP indicator to determine a combined SOP indicator. The combined SOP indicator is compared to a threshold to decide whether or not a Start of Packet event has occurred.

One version includes the individual and summed SOP indicators being weighted in different ways in parallel, so that there are multiple combined decision indicators, each compared to a respective threshold to determine a respective binary-valued SOP event. These multiple binary-valued SOP events are input to a configurable logic function, and the output of the logic function provides an overall Start of Packet event for the receiver. FIG. 4B shows a number denoted N of such combined indicators being formed each as a weighted sum of the 16 summed SOP indicators. N sets of weights, the first denoted W_1,1, W_1,2, ... W_1,M, the second denoted W_2,1, W_2,2, ..., W_2,M, up to denoted W_N,1, W_N,2, ..., W_N,M are shown. The weights are pre-determined according to different environmental situations, and also for different situations. Thus, N combined SOP indicators are formed. Each is compared to a respective threshold to produce N binary-valued SOP events. The N binary-valued SOP events are input to an arbitrary logic function whose output is an SOP event for the receiver.

The SOP event is used in automatic gain control and further to determine the initial timing.

Different sets of weighting factors and different configurable logical function are used depending on the receiving environment. Some of the environmental considerations are:
1. Is the wireless node trying to detect 802.11b, 802.11g, and 802.11n traffic in the 2.4 GHz band, or a subset of that traffic in the 2.4 GHz band.
2. Is the wireless node trying to detect 802.11a and 802.11n traffic in the 5 GHz band, or a subset of the traffic in the 5 GHz band.
3. Is the wireless node in a band where radars must be detected.
4. Is the wireless node operating in high density mode where modifications are made to ignore packets with RSSIs below a certain threshold.
5. Is the wireless node operating outdoors, potentially as part of a mesh network, where the multipath effects will be stronger.
6. Is the wireless node operating in an area where there is a significant amount of foreign interference.
7. Is the wireless node operating with only a single antenna and corresponding receive chain.

The following examples apply to the above situations:
1. If the wireless node trying to detect 802.11b, 802.11g, and 802.11n traffic in the 2.4 GHz band, or a subset of that traffic in the 2.4 GHz band:

$DSSSDetect=\Delta RSSI_1+CorrDSSS_1+AutocorrDSSS_1+\Delta RSSI_2+CorrDSSS_2+AutocorrDSSS_2+\Delta RSSI_3+CorrDSSS_3+AutocorrDSSS_3>12$ dB $OFDMDetect=\Delta RSSI_1+CorrOFDM_1+AutocorrOFDM_1+\Delta RSSI_2+CorrOFDM_2+AutocorrOFDM_2+\Delta RSSI_3+CorrOFDM_3+AutocorrOFDM_3>12$ dB $TX_2MIMODetect=\Delta RSSI_1+CorrTX_2MIMO1+AutocorrOFDM_1+\Delta RSSI_2+CorrTX_2MIMO_2+AutocorrOFDM_2+\Delta RSSI_3+CorrTX_2MIMO_3+AutocorrOFDM_3>12$ dB $TX_3MIMODetect=\Delta RSSI_1+CorrTX_3MIMO_1+AutocorrOFDM_1+\Delta RSSI_2+CorrTX_3MIMO_2+AutocorrOFDM_2+\Delta RSSI_3+CorrTX_3MIMO_3+AutocorrOFDM_3>12$ dB $GF\_Detect=\Delta RSSI_1+Corr\_GF_1+Autocorr\_OFDM_1+\Delta RSSI_2+Corr\_GF_2+Autocorr\_OFDM_2+\Delta RSSI_3+Corr\_GF_3+Autocorr\_OFDM_3>12$ dB If the wireless node is trying to detect all the traffic.
SOPDetect=(DSSSDetect)OR(OFDMDetect)OR(TX$_2$MIMODetect) OR(TX$_3$MIMODetect)OR(GFDetect)

If the wireless node is trying to detect all the 802.11g and 802.11n traffic.
SOP Detect=(OFDM Detect) OR (TX$_2$ MIMO Detect) OR (TX$_3$MIMO Detect) OR (GF Detect)

2. If the wireless node trying to detect 802.11a and 802.11n traffic in the 5 GHz band, or a subset of the traffic in the 5 GHz band:

$DSSS\_Detect=\Delta RSSI_1+Corr\_DSSS_1+Autocorr\_DSSS_1+\Delta RSSI_2+Corr\_DSSS_2+Autocorr\_DSSS_2+\Delta RSSI_3+Corr\_DSSS_3+Autocorr\_DSSS_3>12$ dB $OFDM\_Detect=\Delta RSSI_1+Corr\_OFDM_1+Autocorr\_OFDM_1+\Delta RSSI_2+Corr\_OFDM_2+Autocorr\_OFDM_2+\Delta RSSI_3+Corr\_OFDM_3+Autocorr\_OFDM_3>12$ dB $TX_2MIMO\_Detect=\Delta RSSI_1+Corr\_TX_2MIMO_1+Autocorr\_OFDM_1+\Delta RSSI_2+Corr\_TX_2MIMO_2+Autocorr\_OFDM_2+\Delta RSSI_3+Corr\_TX_2MIMO_3+Autocorr\_OFDM_3>12$ dB $TX_3MIMO\_Detect=\Delta RSSI_1+Corr\_TX_3MIMO_1+Autocorr\_OFDM_1+\Delta RSSI_2+Corr\_TX_3MIMO_2+Autocorr\_OFDM_2+\Delta RSSI_3+Corr\_TX_3MIMO_3+Autocorr\_OFDM_3>12$ dB $GF\_Detect=\Delta RSSI_1+Corr\_GF_1+Autocorr\_OFDM_1+\Delta RSSI_2+Corr\_GF_2+Autocorr\_OFDM_2+\Delta RSSI_3+Corr\_GF_3+Autocorr\_OFDM_3>12$ dB If the wireless node is trying to detect all the traffic.
SOP Detect=(OFDM Detect) OR (TX2 MIMO Detect) OR (TX3MIMO Detect) OR (GF Detect)

If the wireless node is not trying to detect the Greenfield traffic.
SOP Detect=(OFDM Detect) OR (TX2 MIMO Detect) OR (TX3MIMO Detect)

3. If the wireless node in a band where radars must be detected.

$DSSS\_Detect=\Delta RSSI_1+Corr\_DSSS_1+Autocorr\_DSSS_1+\Delta RSSI_2+Corr\_DSSS\_2+Autocorr\_DSSS_2+\Delta RSSI_3+Corr\_DSSS_3+Autocorr\_DSSS_3>12$ dB $OFDM\_Detect=\Delta RSSI_1+Corr\_OFDM_1+Autocorr\_OFDM_1 \Delta RSSI_2+Corr\_OFDM_2+Autocorr\_OFDM_2 \Delta RSSI_3+Corr\_OFDM_3+Autocorr\_OFDM_3>12$ dB $TX_2MIMO\_Detect=\Delta RSSI_1+Corr\_TX_2MIMO_1+Autocorr\_OFDM_1 \Delta RSSI_2+Corr\_TX_2MIMO_2+Autocorr\_OFDM_2 \Delta RSSI_3+Corr\_TX_2MIMO_3+Autocorr\_OFDM_3>12$ dB $TX_3MIMO\_Detect=\Delta RSSI_1+Corr\_TX_3MIMO_1+Autocorr\_OFDM_1 \Delta RSSI_2+Corr\_TX_3MIMO_2+Autocorr\_OFDM_2 \Delta RSSI_3+Corr\_TX_3MIMO_3+Autocorr\_OFDM_3>12$ dB GF_Detect=$\Delta RSSI_1$+Corr_GF$_1$+Autocorr__
OFDM$_1\Delta RSSI_2$+Corr_GF$_2$+Autocorr__
OFDM$_2\Delta RSSI_3$+Corr_GF$_3$+Autocorr__
OFDM$_3$>12 dB RadarDetect$_1$=RSSI$_1$>−62 dBm
RadarDetect$_2$=RSSI$_2$>−62 dBm
RadarDetect$_3$=RSSI$_3$>−62 dBm
RadarDetect=(RadarDetect$_1$)OR(RadarDetect$_2$)OR(RadarDetect$_3$)
SOPDetect=SOPDetect=(OFDMDetect)OR (TX2MIMODetect) OR(TX3MIMODetect)OR(GFDetect)

4. If the wireless node operating in high density mode where modifications are made to ignore packets with RSSIs below a certain threshold.

SOP Detect=(RSSI1>Threshold) OR (RSSI2>Threshold) OR (RSSI3>Threshold)

5. If the wireless node operating outdoors, potentially as part of a mesh network, where the multipath effects will be stronger.

DSSS_Detect=$\Delta RSSI_1$*2+Corr__DSSS$_1$+Autocorr__
DSSS$_1$*2$\Delta RSSI_2$*2+Corr__DSSS$_2$+Autocorr__
DSSS$_2$*2$\Delta RSSI_3$*2+Corr__$_{DSSS3}$+Autocorr__
DSSS$_3$*2>24 dB OFDM_Detect=$\Delta RSSI_1$*2+Corr__OFDM$_1$+Autocorr__OFDM$_1$*2$\Delta RSSI_2$*2+Corr__OFDM$_2$+Autocorr__OFDM$_2$*2$\Delta RSSI_3$*2+Corr__OFDM$_3$+Autocorr__OFDM$_3$*2>24 dB TX$_2$MIMO_Detect=$\Delta RSSI_1$*2+Corr__TX$_2$MIMO$_1$+Autocorr__OFDM$_1$*2$\Delta RSSI_2$*2+Corr__TX$_2$MIMO$_2$+Autocorr__OFDM$_2$*2$\Delta RSSI_3$*2+Corr__TX$_2$MIMO$_3$+Autocorr__OFDM$_3$*2>24 dB TX$_3$MIMO_Detect=$\Delta RSSI_1$*2+Corr__TX$_3$MIMO$_1$+Autocorr__OFDM$_1$*2$\Delta RSSI_2$*2+Corr__TX$_3$MIMO$_2$+Autocorr__OFDM$_2$*2$\Delta RSSI_3$*2+Corr__TX$_3$MIMO$_3$+Autocorr__OFDM$_3$*2>24 dB GF_Detect=$\Delta RSSI_1$*2+Corr_GF$_1$+Autocorr__OFDM$_1$*2$\Delta RSSI_2$*2+Corr_GF$_2$+Autocorr__OFDM$_2$*2$\Delta RSSI_3$*2+Corr_GF$_3$+Autocorr__OFDM$_3$*2>24 dB If the wireless node is trying to detect all the traffic.
SOP Detect=(DSSS Detect) OR (OFDM Detect) OR (TX$_2$ MIMO Detect) OR (TX$_3$MIMO Detect) OR (GF Detect)

6. If the wireless node operating in an area where there is a significant amount of foreign interference.

DSSS_Detect=Corr__DSSS$_1$+Autocorr__DSSS$_1$+Corr__DSSS$_2$+Autocorr__DSSS$_2$+Corr__DSSS$_3$+Autocorr__DSSS$_3$>3 dB OFDM_Detect=Corr__OFDM$_1$+Autocorr__OFDM$_1$+Corr__OFDM$_2$+Autocorr__OFDM$_2$+Corr__OFDM$_3$+Autocorr__OFDM$_3$>3 dB TX$_2$MIMO_Detect=Corr__TX$_2$MIMO$_1$+Autocorr__OFDM$_1$+Corr__TX$_2$MIMO$_2$+Autocorr__OFDM$_2$+Corr__TX$_2$MIMO$_3$+Autocorr__OFDM$_3$>3 dB TX$_3$MIMO_Detect=Corr__TX$_3$MIMO$_1$+Autocorr__OFDM$_1$+Corr__TX$_3$MIMO$_2$+*Autocorr__*OFDM$_2$+Corr__TX$_3$MIMO$_3$+Autocorr__OFDM$_3$>3 dB GF_Detect=Corr_GF$_1$+Autocorr__OFDM$_1$+Corr_GF$_2$+Autocorr__OFDM$_2$+Corr_GF$_3$+Autocorr__OFDM$_3$>3 dB If the wireless node is trying to detect all the traffic.
SOP Detect=(OFDM Detect) OR (TX$_2$ MIMO Detect) OR (TX$_3$MIMO Detect) OR (GF Detect)

7. If the wireless node operating with only a single antenna and corresponding receive chain.

DSSS_Detect=$\Delta RSSI_1$+Corr__DSSS$_1$+Autocorr__DSSS$_1$>5 dB

OFDM_Detect=$\Delta RSSI_1$+Corr__OFDM$_1$+Autocorr>5 dB

TX$_2$MIMO_Detect=$\Delta RSSI_1$+Corr__TX$_2$MIMO$_1$+Autocorr$_1$>5 dB

TX$_3$MIMO_Detect=$\Delta RSSI_1$+Corr__TX$_3$MIMO$_1$+Autocorr__>5 dB

GF_Detect=$\Delta RSSI_1$+Corr_GF$_1$+Autocorr__OFDM$_1$>5 dB

If the wireless node is trying to detect all the traffic.
SOP Detect=(OFDM Detect) OR (TX$_2$ MIMO Detect) OR (TX$_3$MIMO Detect) OR (GF Detect)

In one embodiment, the wireless network maintains a set of environmental profiles, and maintains the optimal set of SOP detection weights to use with respective SOP indicators for each profile. In one version, a management entity in the network pushes an index for a particular profile, or, in one version, a set of SOP indicator weights down to each access point and each client in the wireless network or part thereof.

Note that the SOP detector of FIG. 4B also is usable in a SISO receiver. In such a case the 16 SOP indicators are from one receive chain, rather than summed SOP indicators from a plurality of receive chains.

Figure 5A:
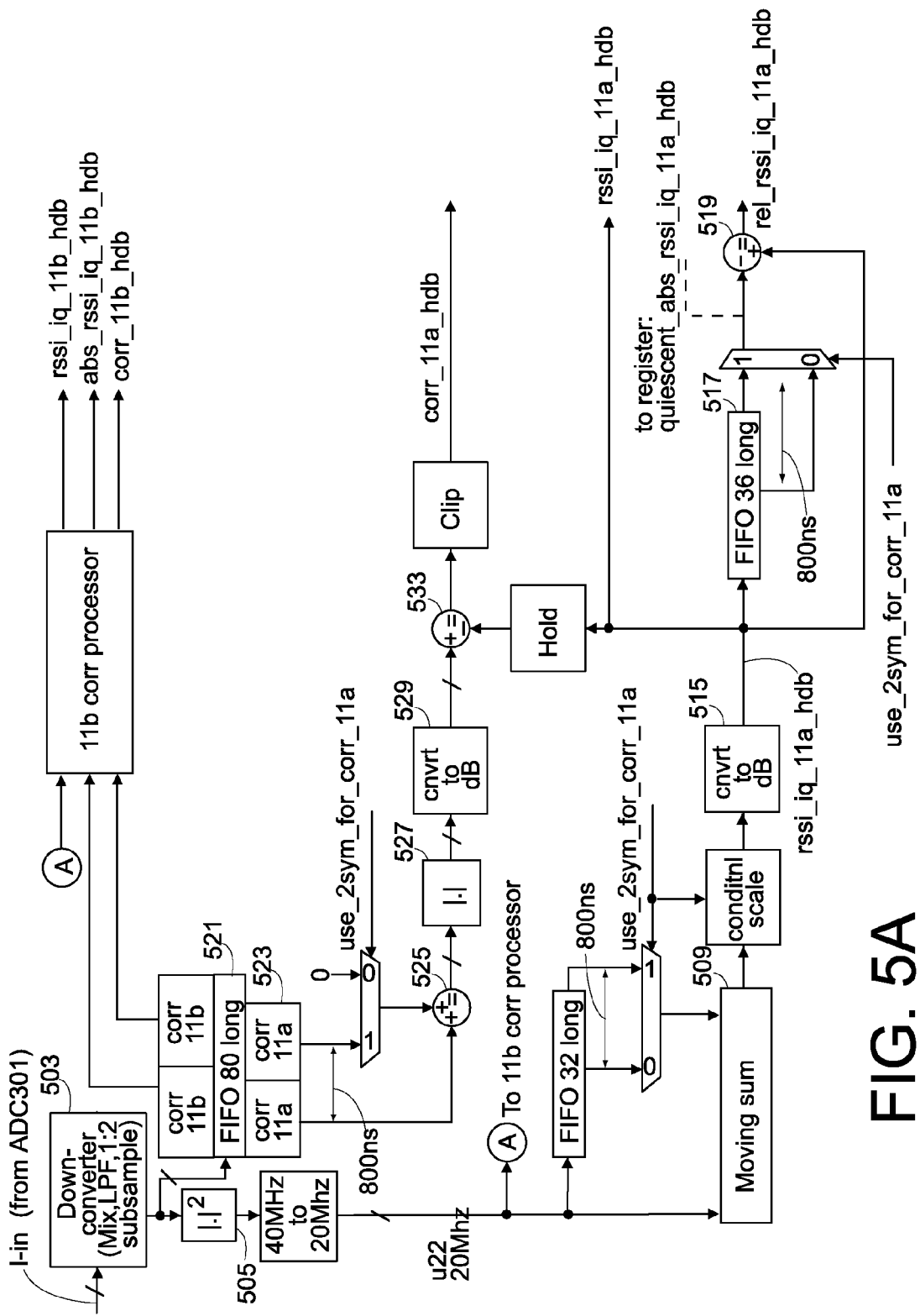
FIG. 5A shows one embodiment of a circuit that determines quantities used as SOP indicators in the SOP detector of FIG. 4A.

FIG. 5A shows one embodiment of a circuit that determines quantities used as SOP indicators in one SISO embodiment. A downconverter 503 downconverts the 80 MHz samples to baseband I,Q signals at 40 MHz.

The instantaneous power of the downconverted input signals is obtained by a squared magnitude circuit 505 and the power signals converted to 20 MHz samples.

The instantaneous input power is averaged in two stages over 1 short symbol (800 ns) if use__2sym_for_corr__11a is false or two short symbols (1600 ns) if use__2sym_for_corr__11a is true. The first stage uses moving sum circuit 509 to sum odd 20 MHz samples with even 20 MHz samples. The second stage averages this 20 MHz pair-wise sum over one or two short symbols.

The resulting average input power is converted to a dB scale with 0.5 dB resolution using a dB converter circuit 515 to generate rssi_iq__11a_hdb, the average power.

One aspect of the invention is that a power rise may be detected as a linear power average, converted to dB, and subtracted from a delayed dB power average.

Thus, for example, the 11a average power rise is constructed by delaying the 11a average power by its averaging length plus 200 ns, i.e. 1000 ns or 1800 ns if use__2sym_for_corr__11a is false or use__2sym_for_corr__11a is true, respectively, using a FIFO 517. A subtractor 519 subtracts the delayed 11a average power from the 11a average power to generate the average power rise rel_rssi_iq__11a_hdb in units of 0.5 dB To generate the 11a correlation quality signal, the downconverted signals are input to a FIFO 521 that is coupled to a correlator 523 which includes a pair of one-symbol correlators.

One aspect to the invention for 11a is that the cross-correlations is performable on either one or two 11a short symbols, depending on the value of a parameter. Specifically, the correlator 523 correlates the input signal at 40 MHz over one short symbol if use__2sym_for_corr__11a is false or two short symbols if use__2sym_for_corr__11a is true. In the latter case the outputs of the two- and one-symbol correlators are added by adder 525 to form the correlation signal. A magnitude circuit 527 computes the correlation magnitude and a logarithmic converter 529 converts the magnitude to a correlation power in a dB scale with 0.5 dB resolution.

In one version, the measure of the correlation quality is a comparison measure of the instantaneous correlation power with the average correlation power in the recent past. In another version, the measure of the correlation quality is a measure of the correlation power normalized by the power of the received signal. FIG. 5A uses the latter. A subtractor 533 calculates the correlation quality corr_11a_hdb as the correlation power normalized by the 11a average power in units of 0.5 dB.

FIG. 5A does not show the details of determining the 11b SOP indicators, and the circuits are essentially similar to those for determining 11a SOP indicators. See FIG. 5D for one example of a correlation quality calculating circuit for 11b. One embodiment provides for performing cross-correlations on either one or two 11b DSSS symbols, irrespective of the scrambling sequence (+1+1 and +1−1). For example, one 11b implementation further includes carrying out non-coherent averaging over another two DSSS symbols, so that there is two symbols' worth of coherent cross-correlation, and this is averaged this over another two DSSS symbols, for a total of four DSSS symbols of coherent and incoherent cross-correlation in inside an 11b correlation processor.

One aspect of the cross correlation quality SOP indicator calculation is that the cross-correlation is converted to dB so it can be normalized by input power.

The circuit of FIG. 5A does not include determining the weighted sum of all the SOP indicators. As an example, determining weighted sum of 11a average power rise and 11a correlation quality is constructed by scaling the correlation quality by a selectable scaling factor then adding the scaled correlation quality to the 11a average power rise The circuit of FIG. 5A also does not include determining the normalized autocorrelation SOP indicator. See FIG. 5E for an exemplary circuit for determining a normalized autocorrelation SOP indicator.

At the same time as the SOP indicators are generated, sop_rssi_iq_quiescent_hdb is captured and stored in a register buffer as part of the register set of the modem 111. sop_rssi_iq_quiescent_hdb is the power average delayed by 1000 or 1800 ns obtained from the FIFO 517. In this way, the average signal power is measured well before the packet is detected and nominally immediately before the packet arrives, so sop_rssi_iq_quiescent_hdb should reflect the power of the noise on the medium. sop_rssi_iq_quiescent_hdb is updated whenever the SOP circuit detects an apparent packet.

In an alternate embodiment, since a packet may be detected several Us after the packet begins, the logic maintains a buffer of quiescent noise powers and reports the oldest one when a packet is detected. In one buffer implementation, the reported quiescent noise power is between 8 and 12 μs before the packet is detected, which is almost certainly noise only.

In one embodiment, sop_rssi_iq_quiescent_hdb is used to determine the CNR (carrier-to-noise ratio), e.g., for determining which weights and/or which indicators to use, and further for the purpose of determining the initial timing.

Figure 6:
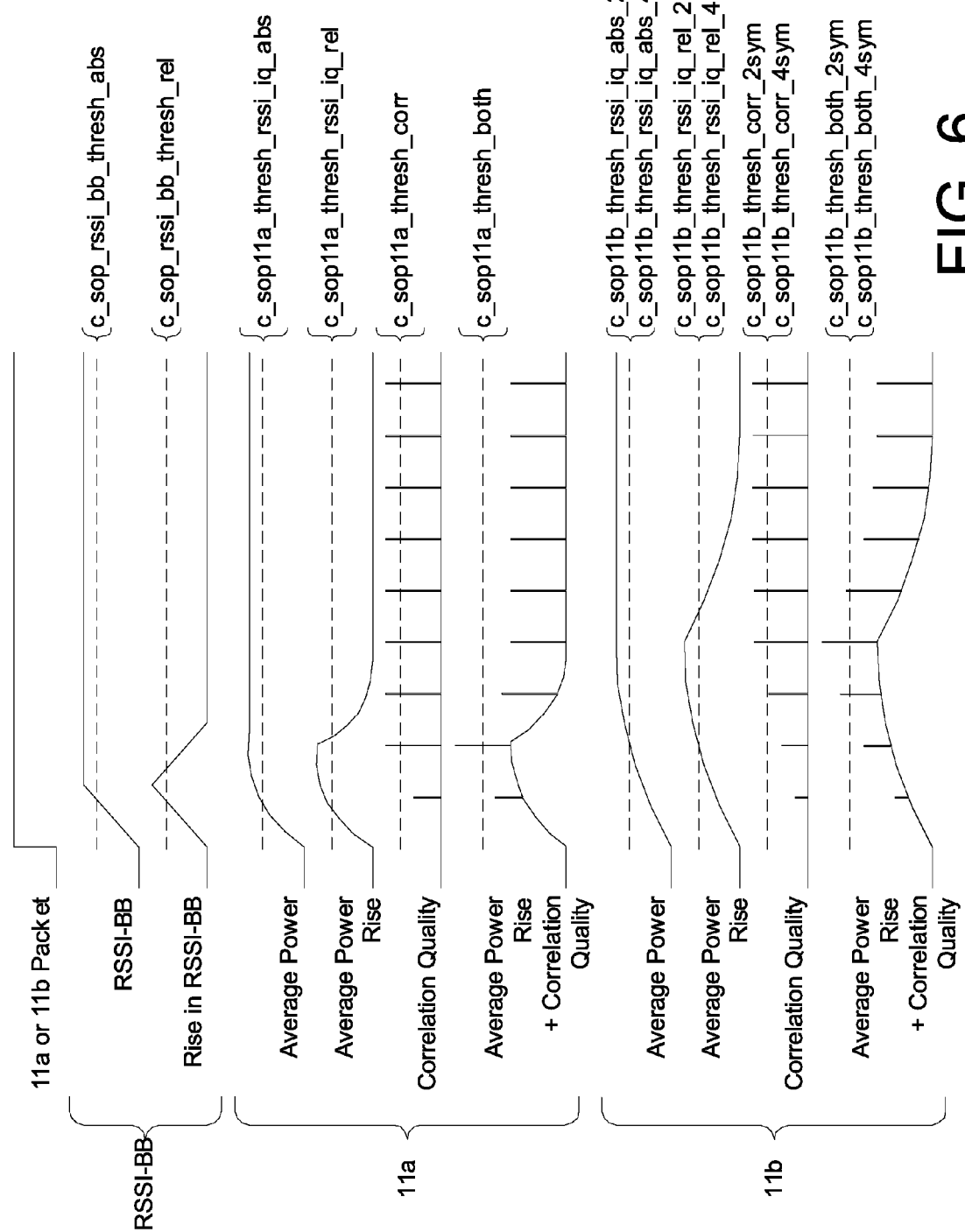
FIG. 6 shows some idealized waveforms for some of the SOP indicators, and also for a combined indicator being the sum of two of the SOP indicators.

FIG. 6 shows some idealized waveforms for some of the SOP indicators, and also for a combined indicator being the sum of two of the SOP indicators, as produced, for example by the circuit of FIG. 5A.

Figure 5B:
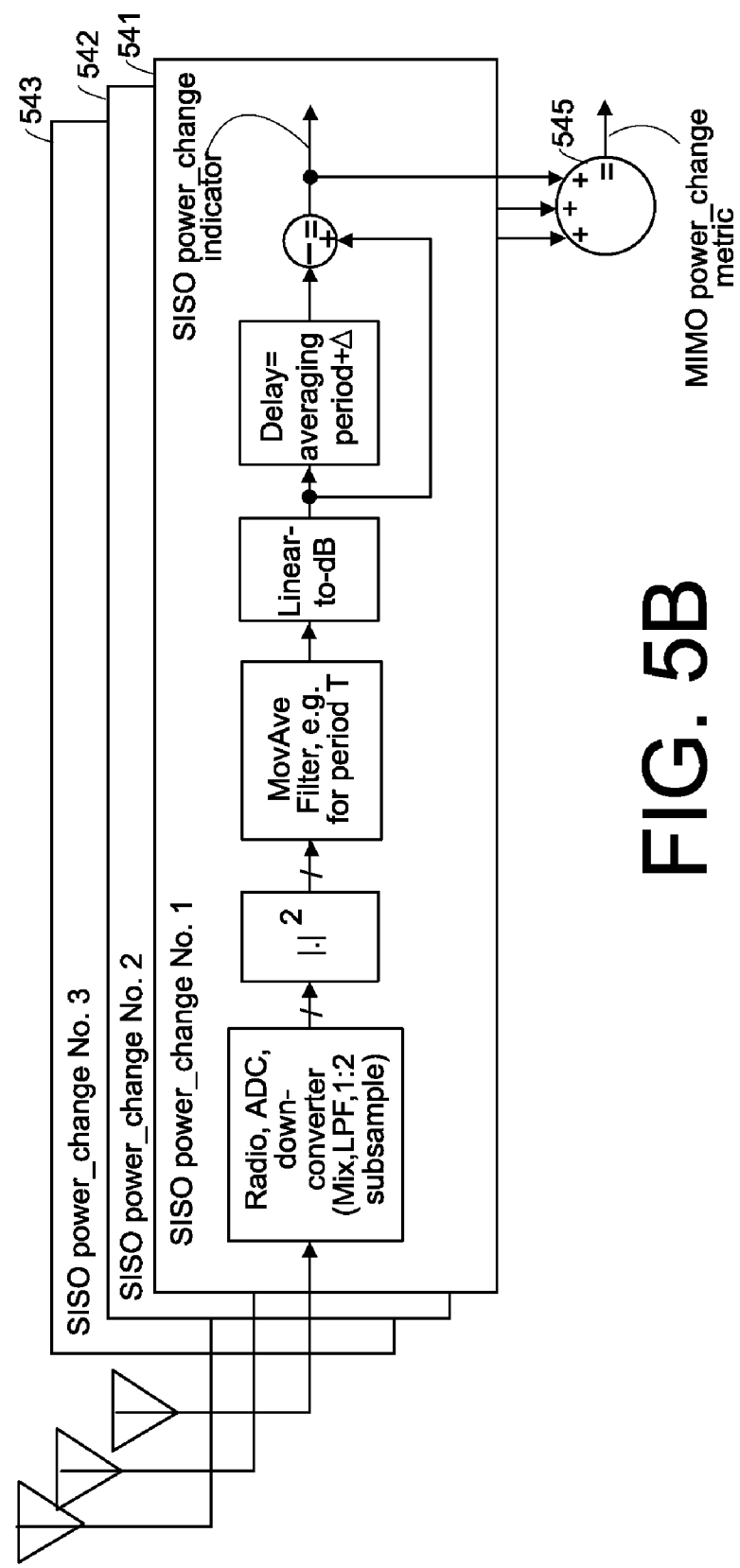
FIG. 5B shows an embodiment for obtaining the average power rise SOP indicator for an exemplary three-antenna-three receive chain receiver suitable for a MIMO wireless node and for a MRC wireless node.

FIG. 5B shows an embodiment for obtaining the average power rise SOP indicator for an exemplary three-antenna-three receive chain receiver suitable for a MIMO wireless node and for a MRC wireless node. Three SISO power change SOP indicator circuits 541, 542, and 543 are shown that each determine the average signal power rise from samples from the main ADC by averaging the amplitude squared of samples using a moving average over a configurable averaging time, e.g., the short symbol period T, followed by a linear to dB converter. The result has subtracted a delayed version of itself to produce a SISO power change SOP indicator. The three SISO power change SOP indicators are added by a summer 545 to produce the MIMO power rise SOP indicator.

Note that in an alternate embodiment to that shown in FIG. 5B, the adding of the SOP indicators for the individual antennas is done on linear scale data to produce a linear scale summed SOP indicator. The linear scale summed SOP indicator in another embodiment is converted to log scale by a linear to dB converter for the summed linear-scale quantity.

Figure 5C:
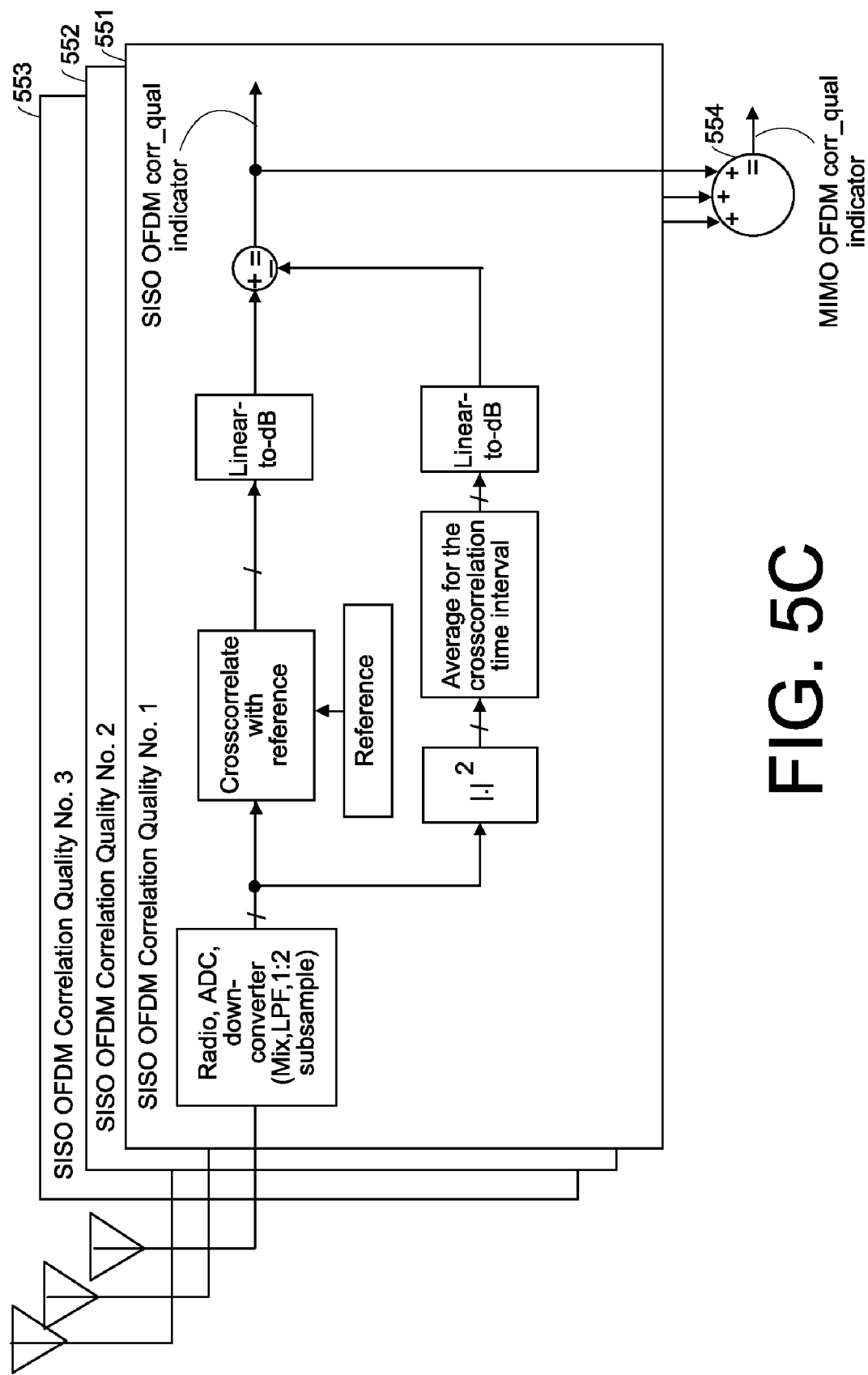
FIG. 5C shows an embodiment for obtaining the correlation quality SOP indicator for OFDM packets conforming to OFDM variants of the IEEE 802.11 standard for an exemplary three-antenna-three receive chain receiver suitable for a MIMO wireless node and for a MRC wireless node.

FIG. 5C shows an embodiment for obtaining the correlation quality SOP indicator for OFDM packets conforming to OFDM variants of the IEEE 802.11 standard for an exemplary three-antenna-three receive chain receiver suitable for a MIMO wireless node and for a MRC wireless node. The correlation quality is expressed as a measure of the cross-correlation of the received waveform with a reference, being a known part of the transmitted signal, or in one embodiment, a set of known waveforms. The cross correlation is divided by—actually in a log scale, by subtraction of—the energy in the signal over the same period of time as the cross correlation. Three SISO OFDM correlation quality SOP indictor circuits 551, 552, and 553 are shown for the three receive chains. Each produces an individual SISO OFDM correlation quality SOP indictor, and these three indicators are added in a summer 554 to produce the overall MIMO DSSS correlation quality SOP indictor.

Note that in an alternate embodiment to that shown in FIG. 5C, the adding of the SOP indicators for the individual antennas is done on linear scale data to produce a linear scale summed SOP indicator. The linear scale summed SOP indicator in another embodiment is converted to log scale by a linear to dB converter for the summed linear-scale quantity.

Figure 5D:
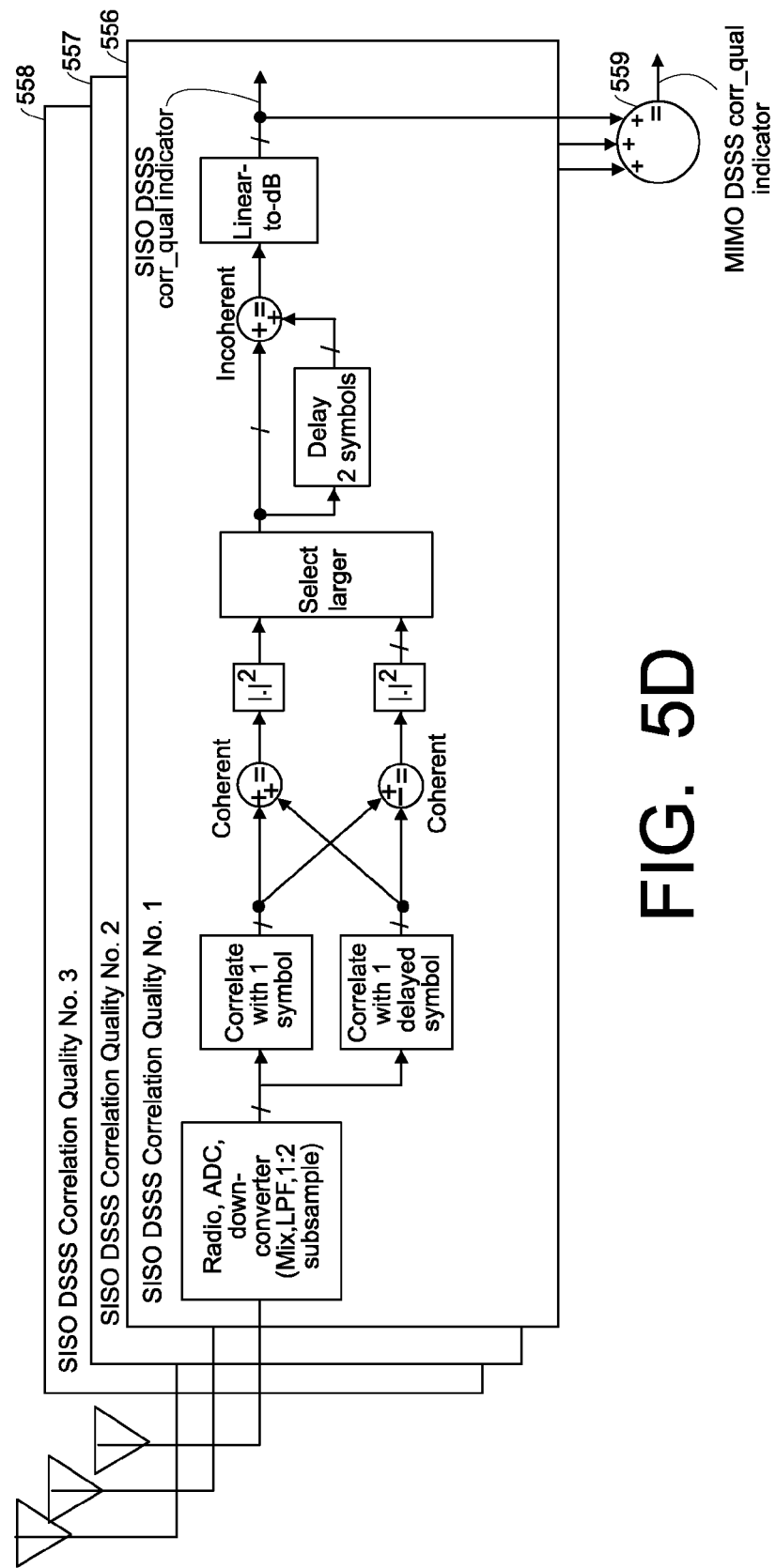
FIG. 5D shows an embodiment for obtaining the correlation quality SOP indicator for DSSS packets conforming to the IEEE 802.11b standard for an exemplary three-antenna-three receive chain receiver suitable for a MIMO wireless node and for a MRC wireless node.

FIG. 5D shows an embodiment for obtaining the correlation quality SOP indicator for DSSS packets conforming to the IEEE 802.11b standard for an exemplary three-antenna-three receive chain receiver suitable for a MIMO wireless node and for a MRC wireless node. Three SISO DSSS correlation quality SOP indictor circuits 556, 557, and 558 are shown for the three receive chains. Each produces an individual SISO DSSS correlation quality SOP indictor, and these three indicators are added in a summer 559 to produce the overall MIMO DSSS correlation quality SOP indictor.

In one embodiment, the SISO DSSS correlation quality SOP indictor circuits each include non-coherent 11b averaging over another two DSSS symbols, such that in one embodiment, there is worth symbols of coherent cross-correlation and further averaging over another 2 DSSS symbols, for 4 DSSS symbols of coherent and incoherent cross-correlation.

Note that in an alternate embodiment to that shown in FIG. 5C, the adding of the SOP indicators for the individual antennas is done on linear scale data to produce a linear scale summed SOP indicator. The linear scale summed SOP indicator in another embodiment is converted to log scale by a linear to dB converter for the summed linear-scale quantity.

Figure 5E:
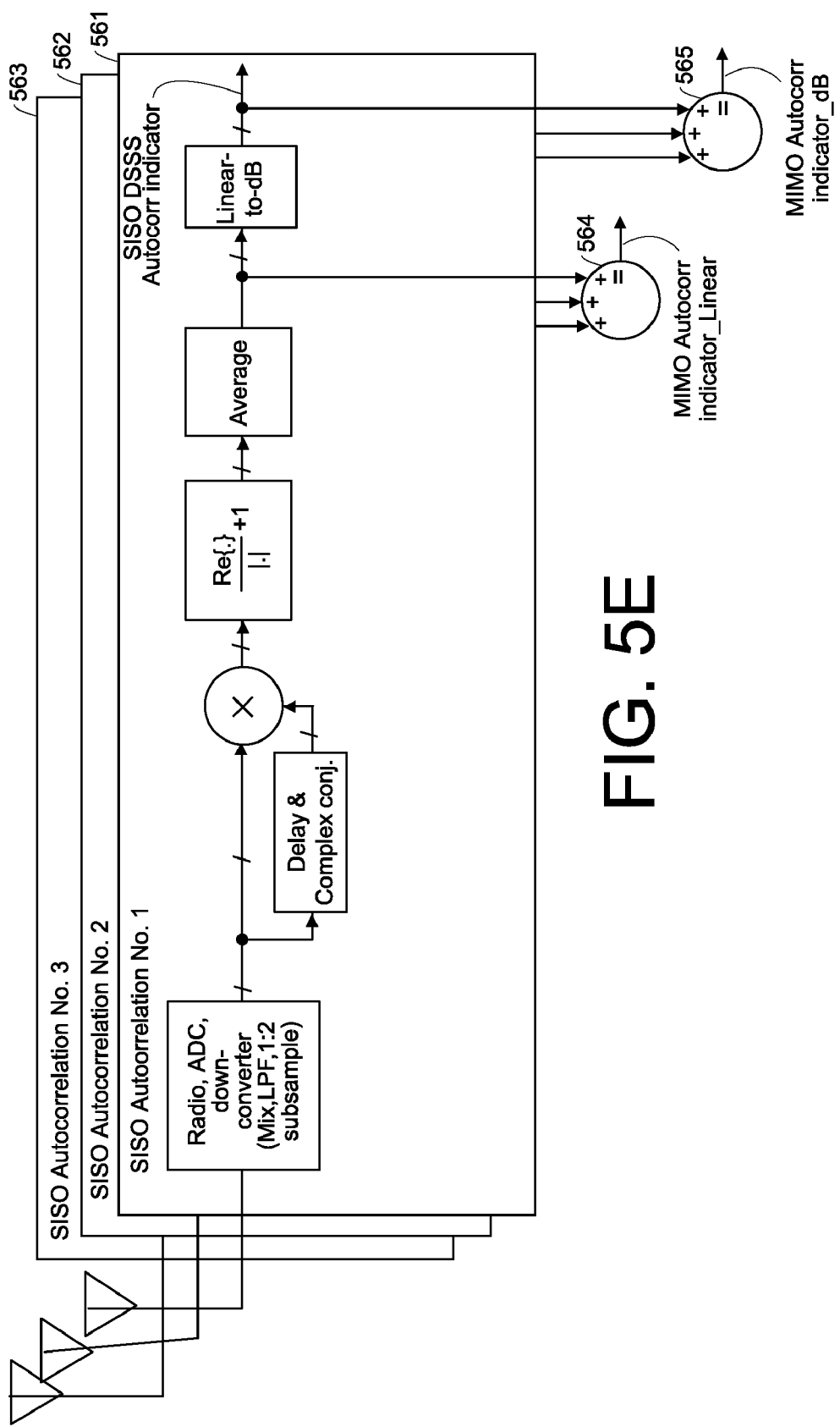
FIG. 5E shows an embodiment for obtaining the normalized autocorrelation SOP indicator for an exemplary three-antenna-three receive chain receiver suitable for a MIMO wireless node and for a MRC wireless node.

FIG. 5E shows an embodiment for obtaining the normalized autocorrelation SOP indicator for an exemplary three-antenna-three receive chain receiver suitable for a MIMO wireless node and for a MRC wireless node. Three normalized autocorrelation SOP indictor circuits 561, 562, and 563 are shown for the three receive chains. Each produces an individual SISO normalized autocorrelation SOP indictor, and the linear scale version of three indicators are added in a first summer 564 to produce the overall MIMO normalized autocorrelation SOP indictor. In addition, each of the SISO normalized autocorrelation SOP indictor circuits 561, 562, and 563 include a linear to dB converter to produce a log-scale SISO normalized autocorrelation SOP indictor, and these log-scale indicators are added by a second summer 565 to produce the overall log-scale MIMO normalized autocorrelation SOP indictor.

A SISO normalized autocorrelation SOP indictor circuit includes accepting samples, multiplying the samples with a complex conjugated delayed version and averaging over an autocorrelation interval.

One embodiment further includes prior to the averaging, normalizing the product by the magnitude of the product, and adding unity so that the result is strictly positive and so that a dB version can be meaningfully defined In one embodiment, the normalized autocorrelation measure circuit provides a set of SOP indicators, each such indicator calculated over a different one of a plurality of delays and over a different one of a plurality of multiple integration times for the moving average to generate a set of normalized autocorrelation indicators.

FIG. 5E also shows the adding of the SOP indicators for the individual antennas is done on linear scale data to produce a linear scale summed SOP indicator. The linear scale summed SOP indicator in another embodiment is converted to log scale by a linear to dB converter for the summed linear-scale quantity.

Thus, that some of the SISO SOP indicator circuits described above produce only a log-scale SOP indicator, in alternate embodiments, as in FIG. 5E, both linear scale and log-scale versions of the SOP indicators are determined, and furthermore, the summation of the data for the different antennas/receive chains in some embodiments is carried out on linear-scale data.

Thus a plurality of SOP indicators of the four types are generated for input to the circuit of FIG. 4B to determine an SOP event.

Determining Initial Timing

Some of the SOP indicators, or signals related thereto are also used to determine the initial timing. In a SISO embodiment, the determining of the initial timing is essentially as described in above-referenced incorporated-by-reference U.S. patent application Ser. No. 10/698,703. In the MIMO case, in one embodiment, the timing is determined by a single one of the receive chains that acts as the master.

The initial timing determining method includes determining a plurality of metrics from the received signal, and using at least two of the plurality of metrics to determine an initial timing for a received packet. Some of the metrics, or quantities related thereto are those produced by the SISO indicator circuits described above. Different versions of the initial timing method combine the metrics in different ways to determine the initial timing.

Figure 7:
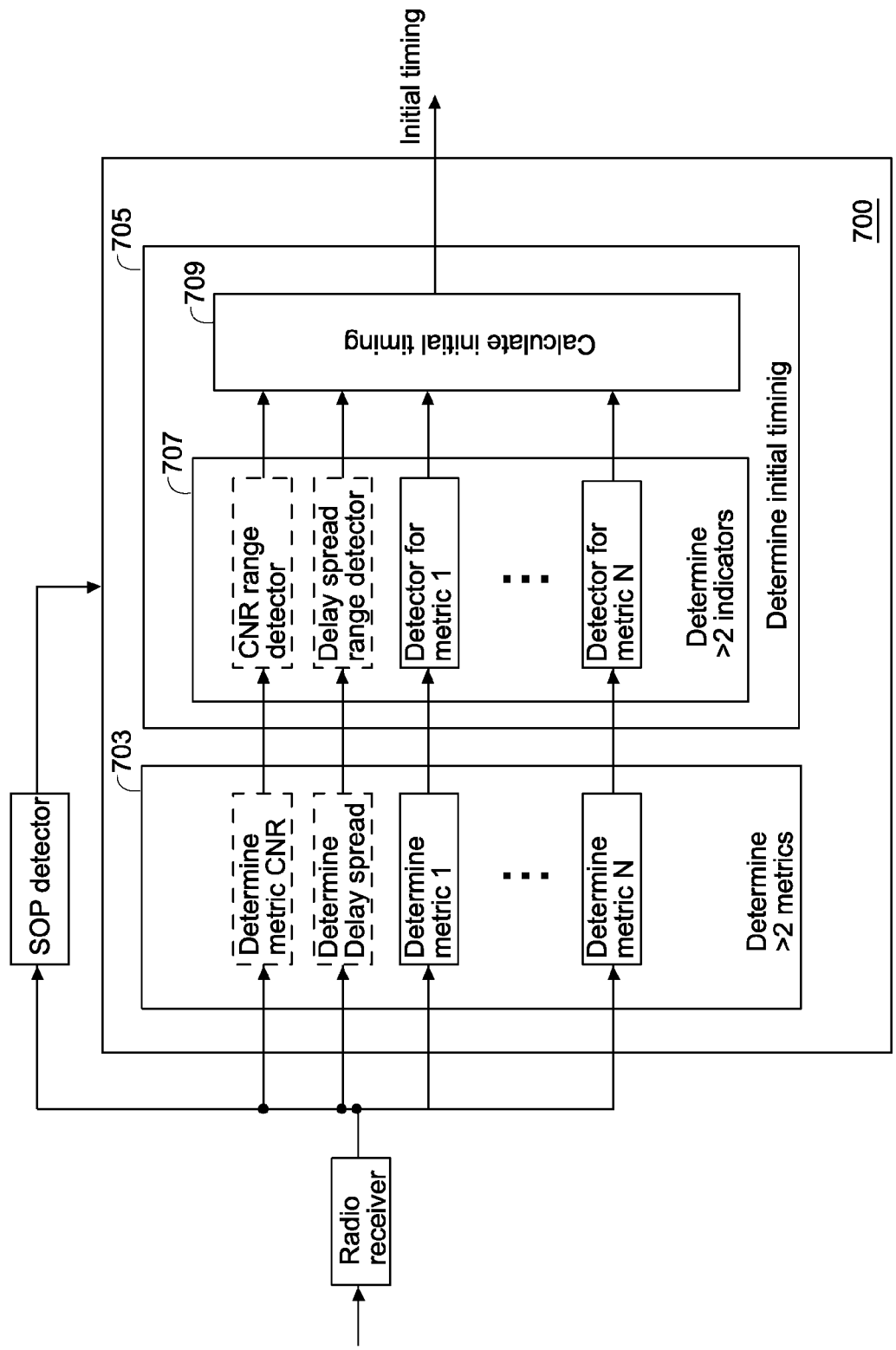
FIG. 7 shows an embodiment of an apparatus that implements a method of determining the initial timing.

According to embodiments described herein, the preamble of the packet according to the wireless networking standard, e.g., IEEE 802.11a, has a first part that includes a series of periodic symbols and a second part. FIG. 7 shows an embodiment of an apparatus 700 that implements the method. The apparatus includes a circuit 703 that determines at least two of the following metrics: a measure of the CNR (carrier to noise ratio), a measure of the received signal power, a measure of the autocorrelation of the input signal at the period of the symbols, a measure the correlation of the input signal with at least one of the short symbols, and a measure of the correlation of the input signal with the start of the second part of the preamble. In the case of the standard using OFDM packets, e.g., e.g., IEEE 802.11a, the metrics of which at least two are determined further include: a measure of the short-term power spectral density of the received signal, and a measure of interference between OFDM symbols.

In an alternate embodiment, the set of metrics of which at least two are determined includes a measure of the delay spread.

FIG. 7 includes a circuit 705 that determines the initial timing. Determining the initial timing uses at least two timing indicators of the set of timing indicators.

Thus, the circuit 705 that determines the initial timing includes a circuit 707 to generate at least two timing indicators. Circuit 707 includes a plurality of detectors, e.g., a detector for the range of the CNR if the CNR is determined and/or a detector for the range of the delay spread if the delay spread is determined, and detector(s) for any other indicator(s) that are determined.

The apparatus 700 includes an initial time calculator that implements the calculation of the initial timing. Circuit 709 calculates the timing from at least one of several measures.

The metrics, timing indicators, and timings available for initial timing determination are now discussed in more detail for the case of a packet conforming to one of the OFDM variants of the IEEE 802.11 standard. The following information is available for initial timing determination:

The RSSI jump at the start of packet.
The first peak in the correlation of the received signal with the short symbol.
A drop in the correlation peaks of the received signal correlated with the short symbol.
A drop in the autocorrelation of the received signal in the short symbol interval as detected, e.g., by an inverse measure of the autocorrelation exceeding a threshold.
Detect the transition between the short and long symbol part of the preamble, i.e. between the short training field and long training field) by performing a correlation of the received signal with the first guard interval and a threshold to detect the correlation peak.
The first peak in the correlation with the long symbol.
Rise in the autocorrelation of the signal in the long symbol part (long training field) of the preamble, as detected, e.g., by a measure of the autocorrelation exceeding a threshold.
A change in the short-term power spectral density from short to long symbols, as indicated by appearance in energy in the subcarriers not used in the short symbols but used in the long symbols;
The time shift in the channel impulse response determined during the long symbols that produces minimum interference between OFDM symbols.

We have found that using a hybrid method of detecting the SOP works well in practice, and further that using a hybrid method of determining the initial timing works well in practice.

It should be appreciated that although the invention has been described in the context of the IEEE 802.11 standard, the invention is not limited to such contexts and may be utilized in various other applications and systems, for example in other wireless receivers for use in a packetized wireless network.

In keeping with common industry terminology, the terms "base station", "access point", and "AP" may be used interchangeably herein to describe an electronic device that may communicate wirelessly and substantially simultaneously with multiple other electronic devices, while the terms "client," "mobile device" and "STA" may be used interchangeably to describe any of those multiple other electronic devices, which may have the capability to be moved and still communicate, though movement is not a requirement. However, the scope of the invention is not limited to devices that are labeled with those terms.

While an embodiment has been described for operation in a receiver with RF frequencies in the 5 GHz range and 2.4 GHz range (the 802.11a and 802.11b and 802.11g variants of the IEEE 802.11 standard, the invention may be embodied in receivers and transceivers operating in other RF frequency ranges. Furthermore, while a transceiver embodiment for operation conforming to the IEEE 802.11 standards has been described, the invention may be embodied in receivers conforming to other standards and for other applications, including, for example other WLAN standards and other wireless standards. Applications that can be accommodated include IEEE 802.11 wireless LANs and links, wireless Ethernet, HIPERLAN 2, European Technical Standards Institute (ETSI) broadband radio access network (BRAN), and multimedia mobile access communication (MMAC) systems, wireless local area networks, local multipoint distribution service (LMDS) IF strips, wireless digital video, wireless USB links, wireless IEEE 1394 links, TDMA packet radios, low-cost point-to-point links, voice-over-IP portable "cell phones" (wireless Internet telephones), etc.

In the context of this document, the term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not.

Note "MRC" as used herein means multiple receiver combining. This is a receive node that includes a plurality of receive chains each with a receive antenna. The outputs of the receive chain are combined, e.g., weighted in phase and amplitude. One method of combining is known as "maximum ratio combining" and the term MRC is sometimes used for such combining. In the present disclosure, MRC is used as a more general term for multiple receiver combining. One example of multiple receiver combining uses maximum ratio combining as the combining method.

Note that the specification and claims sometimes refer to the baseband signals. It is to be understood that depending on the particular embodiment, these may be I,Q signals at true baseband, or an I-signal at "low-IF" that is relatively close to baseband. For example, one embodiment of the analog part of the receiver in radio 109 generates low-IF signals that are centered at 20 MHz and that are then digitized and downconverted to true baseband I,Q signals. The term baseband will include such low-IF signals and those in the art should understand from the context whether or not a "baseband" signal is a true baseband signal or a low-IF signal.

The term rectangular coordinates when applied to signal samples is sometimes referred to as "I, Q" coordinates, "quadrature" components and "complex numbers" (assumed in rectangular coordinates) herein.

Note that by "magnitude" is meant an indication of magnitude, and alternate embodiments may use different indications, such as the actual magnitude, $(I^2+Q^2)$, $\max\{|I|+\rho|Q|\}$ where $\rho$ is a constant, and so forth. Furthermore, in determining the correlation quality, the baseline samples in different embodiments may be drawn from the past, future, or some combination of the past and future.

Note that embodiments herein describe measures that are converted to a logarithmic scale, e.g., dB scale. Those in the art will understand that the processes described can be carried out in other than a logarithmic scale, e.g., in a linear scale. Furthermore, those in the art will also understand that n the case measures or indicators are determined in a logarithmic scale, the locations along a calculation chain at which the conversion to or from the logarithmic scale does not need to be as indicated in the specific example embodiments; those of ordinary skill in the art will understand how to make needed modification to move where along a particular chain such conversion or conversions occur.

Unless specifically stated otherwise, as apparent from the following discussions, it is appreciated that throughout the specification discussions utilizing terms such as "processing," "computing," "calculating," "determining" or the like, refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer" or a "computing machine" or a "computing platform" may include one or more processors.

Note that while the above embodiments use special purpose hardware, another embodiment of the modem 111 includes a processor, and one embodiment of the methods described herein is in the form of a computer program that executes on a processing system, e.g., a one or more processors that are part of a modem for a wireless network node. The methodologies described herein are, in one embodiment, performable by one or more processors that accept computer-readable (also called machine-readable) code containing a set of instructions that when executed by one or more of the processors carry out at least one of the methods described herein. Any processor capable of executing a set of instructions (sequential or otherwise) that specify actions to be taken are included. Thus, one example is a typical processing system that includes one or more processors. Each processor may include one or more of a CPU, a graphics processing unit, and a programmable DSP unit. The processing system further may include a memory subsystem including main RAM and/or a static RAM, and/or ROM. A bus subsystem may be included for communicating between the components. The processing system further may be a distributed processing system with processors coupled by a network. If the processing system requires a display, such a display may be included, e.g., a liquid crystal display (LCD) or a cathode ray tube (CRT) display. If manual data entry is required, the processing system also includes an input device such as one or more of an alphanumeric input unit such as a keyboard, a pointing control device such as a mouse, and so forth. The term memory unit as used herein, if clear from the context and unless explicitly stated otherwise, also encompasses a storage system such as a disk drive unit. The processing system in some configurations may include a sound output device, and a network interface device. The memory subsystem thus includes a computer-readable carrier medium that carries computer-readable code (e.g., software) including a set of instructions to cause performing, when executed by one or more processors, one of more of the methods described herein. Note that when the method includes several elements, e.g., several steps, no ordering of such elements is implied, unless specifically stated. The software may reside in the hard disk, or may also reside, completely or at least partially, within the RAM and/or within the processor during execution thereof by the computer system. Thus, the memory and the processor also constitute computer-readable carrier medium carrying computer-readable code.

Furthermore, a computer-readable carrier medium may form, or be includes in a computer program product.

In alternative embodiments, the one or more processors operate as a standalone device or may be connected, e.g., networked to other processor(s), in a networked deployment, the one or more processors may operate in the capacity of a server or a client machine in server-client network environment, or as a peer machine in a peer-to-peer or distributed network environment. The one or more processors may form a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine.

Note that while some diagram(s) only show(s) a single processor and a single memory that carries the computer-readable code, those in the art will understand that many of the components described above are included, but not explicitly shown or described in order not to obscure the inventive aspect. For example, while only a single machine is illustrated, the term "machine" shall also be taken to include any collection of machines that individually or jointly execute a set (or multiple sets) of instructions to perform any one or more of the methodologies discussed herein.

Thus, one embodiment of each of the methods described herein is in the form of a computer-readable carrier medium carrying a set of instructions, e.g., a computer program that are for execution on one or more processors, e.g., one or more processors that are part of a wireless receiver. Thus, as will be appreciated by those skilled in the art, embodiments of the present invention may be embodied as a method, an apparatus such as a special purpose apparatus, an apparatus such as a data processing system, or a computer-readable carrier medium, e.g., a computer program product. The computer-readable carrier medium carries computer readable code including a set of instructions that when executed on one or more processors cause the processor or processors to implement a method. Accordingly, aspects of the present invention may take the form of a method, an entirely hardware embodiment, an entirely software embodiment or an embodiment combining software and hardware aspects. Furthermore, the present invention may take the form of carrier medium (e.g., a computer program product on a computer-readable storage medium) carrying computer-readable program code embodied in the medium.

The software may further be transmitted or received over a network via a network interface device. While the carrier medium is shown in an exemplary embodiment to be a single medium, the term "carrier medium" should be taken to include a single medium or multiple media (e.g., a centralized or distributed database, and/or associated caches and servers) that store the one or more sets of instructions. The term "carrier medium" shall also be taken to include any medium that is capable of storing, encoding or carrying a set of instructions for execution by one or more of the processors and that cause the one or more processors to perform any one or more of the methodologies of the present invention. A carrier medium may take many forms, including but not limited to, non-volatile media, volatile media, and transmission media. Non-volatile media includes, for example, optical, magnetic disks, and magneto-optical disks. Volatile media includes dynamic memory, such as main memory. Transmission media includes coaxial cables, copper wire and fiber optics, including the wires that comprise a bus subsystem. Transmission media also may also take the form of acoustic or light waves, such as those generated during radio wave and infrared data communications. For example, the term "carrier medium" shall accordingly be taken to included, but not be limited to, solid-state memories, a computer product embodied in optical and magnetic media, a medium bearing a propagated signal detectable by at least one processor of one or more processors and representing a set of instructions that when executed implement a method, a carrier wave bearing a propagated signal detectable by at least one processor of the one or more processors and representing the set of instructions a propagated signal and representing the set of instructions, and a transmission medium in a network bearing a propagated signal detectable by at least one processor of the one or more processors and representing the set of instructions.

It will be understood that the steps of methods discussed are performed in one embodiment by an appropriate processor (or processors) of a processing (i.e., computer) system executing instructions (computer-readable code) stored in storage. It will also be understood that the invention is not limited to any particular implementation or programming technique and that the invention may be implemented using any appropriate techniques for implementing the functionality described herein. The invention is not limited to any particular programming language or operating system.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the invention requires more features than are expressly recited herein. Rather, inventive aspects lie in less than all features of a single foregoing disclosed embodiment. Thus, any claims following the Detailed Description are hereby expressly incorporated into this Detailed Description, with each such claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in any claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

"Variants of the IEEE 802.11 standard" as used herein means the variants and proposed variants of the IEEE 802.11 standard. Variants are versions defined in clauses of the standard and proposed amendments of the standard.

While one embodiment of the OFDM receiver accepts an IF signal that requires further downconversion to obtain baseband I,Q signals, in another embodiment, the analog portion provides baseband I,Q signals that require no further downconversion.

All publications, patents, and patent applications cited herein are hereby incorporated by reference.

Any discussion of prior art in this specification should in no way be considered an admission that such prior art is widely known, is publicly known, or forms part of the general knowledge in the field.

Any one of the terms comprising, comprised of or which comprises is an open term that means including at least the elements/features that follow, but not excluding others. Thus, the term comprising, when used in the claims or elsewhere, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

Similarly, it is to be noticed that the term coupled, when used in the herein, should not be interpreted as being limitative to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

We claim:

1. A method comprising:

receiving a respective signal in each of a plurality of receive chains of a receiver of a wireless network, the receiver configured to receive signals corresponding to a wireless transmission of a packet from a transmitting station of the wireless network, the packet having a preamble and a data part;

calculating a plurality of start of packet (SOP) indicators, each for one or more of the receive chains;

determining one or more linear combinations of respective pluralities of the calculated SOP indicators to form one or more combined SOP indicators;

comparing each of a plurality of SOP indicators or combined SOP indicators, including at least one of the combined SOP indicators to a respective threshold to form one or more respective SOP events; and in the case there is more than one SOP event, determining a logic function of the SOP events to form a SOP decision event, wherein the plurality of SOP indicators include for each of at least two of the receive chains at least one SOP indicator based on a measure of the received signal strength or based on a measure of the average received signal strength or based on a measure of a change in received signal strength or based on a measure of a change in an average of the received signal strength, or wherein the plurality of SOP indicators include two or more of:

one or more SOP indicators each based on a measure of a change in received signal strength or of a change in an average of the received signal strength;

one or more SOP indicators based on a measure of the received signal strength or of the average received signal strength;

one or more SOP indicators based on one or more measures of the quality of the correlation of the input signal with a known part of the preamble; and one or more SOP indicators based on one or more normalized measures of the autocorrelation of the received waveform.

2. A method as recited in claim 1, wherein the plurality of SOP indicators include two or more of:

one or more SOP indicators each based on a measure of a change in received signal strength or of a change in an average of the received signal strength;

one or more SOP indicators based on a measure of the received signal strength or of the average received signal strength;

one or more SOP indicators based on one or more measures of the quality of the correlation of the input signal with a known part of the preamble; and one or more SOP indicators based on one or more normalized measures of the autocorrelation of the received waveform.

3. A method as recited in claim 2, wherein a plurality of SOP events are determined for a plurality of packet types that are supported by the receiver.

4. A method as recited in claim 2, wherein the measure of the change in received signal strength is a measure of average power subtracted from a delayed average.

5. A method as recited in claim 1, wherein the plurality of SOP indicators include two or more of:
- for each receive chain, the average received signal power;
- for each receive chain, the average power rise of the received signal for the receive chain;
- for each receive chain, at least one measure of the quality of the correlation of the input signal with a known part of the preamble;
- for each receive chain, at least one measure of the normalized autocorrelation of one or more sections of a known part of the preamble;
- a weighted sum across all receive chains of the average received signal powers;
- a weighted sum across all receive chains of the average power rise of the received signal;
- a weighted sum across all receive chains of measures of the quality of the correlation of the input signal with a known part of the preamble; and
- a weighted sum across all receive chains at least one measure of the normalized autocorrelation of one or more sections of a known part of the preamble,
- wherein at least one of the SOP indicators that are weighted sums are included in the plurality of SOP indicators.

6. A method as recited in claim 5, wherein a plurality of SOP events are determined for a plurality of packet types that are supported by the receiver.

7. A method as recited in claim 5, wherein each measure of the normalized autocorrelation is determined for a delay and for an integration time, and wherein a plurality of measures of the normalized autocorrelation are determined, each such autocorrelation indicator calculated over a different one of a plurality of delays and over a different one of a plurality of integration times.

8. A method as recited in claim 5, wherein each measure of the correlation quality is determined for an integration time, and wherein a plurality of measures of the correlation quality are determined, each such indicator calculated over a different one of a plurality of integration times.

9. A method as recited in claim 5, wherein at least on one of the included SOP indicators that are weighted sums is determined as a weighted sum of logarithmically scaled single receive chain SOP indicators.

10. A method as recited in claim 5, wherein at least one of the included SOP indicators that is a weighted sum is determined as a logarithmic-scale conversion of a weighted sum of SOP indicators prior to logarithmic conversion.

11. A method as recited in claim 5, wherein the logic function is configurable, the method further comprising predefining one or more profiles each with a set of weighting factors and configurable logical function, each for use for a different receiving environment.

12. A method as recited in claim 5, further comprising:
using a plurality of the SOP indicators to determine initial timing.

13. An apparatus in a receiver of a wireless network, the apparatus comprising:
- a plurality of receive chains each including an antenna and configured to receive a respective signal corresponding to a wireless transmission of a packet from a transmitting station of the wireless network, the packet having a preamble and a data part;
- calculating subsystems coupled the to receive chains, each operative to calculate a start of packet (SOP) indicator for one or more of the receive chains;
- a summer subsystem coupled to the calculating subsystems, and operative to determine one or more linear combinations of respective pluralities of the calculated SOP indicators to form one or more combined SOP indicators;
- one or more comparator subsystems coupled to the summer subsystem and operative to compare each of a plurality of SOP indicators or combined SOP indicators, including at least one of the combined SOP indicators to a respective threshold to form one or more respective SOP events; and
- a logic circuit coupled to the outputs of the comparator subsystems and operative to determining a logic function of the SOP events to form a SOP decision event,
- wherein the plurality of SOP indicators include for each of at least two of the receive chains at least one SOP indicator based on a measure of the received signal strength or based on a measure of the average received signal strength or based on a measure of a change in received signal strength or based on a measure of a change in an average of the received signal strength, or
- wherein the plurality of SOP indicators include two or more of:
  - one or more SOP indicators each based on a measure of a change in received signal strength or of a change in an average of the received signal strength;
  - one or more SOP indicators based on a measure of the received signal strength or of the average received signal strength;
  - one or more SOP indicators based on one or more measures of the quality of the correlation of the input signal with a known part of the preamble; and
  - one or more SOP indicators based on one or more normalized measures of the autocorrelation of the received waveform.

14. An apparatus as recited in claim 13, wherein the plurality of SOP indicators include two or more of:
- one or more SOP indicators each based on a measure of a change in received signal strength or of a change in an average of the received signal strength;
- one or more SOP indicators based on a measure of the received signal strength or of the average received signal strength;
- one or more SOP indicators based on one or more measures of the quality of the correlation of the input signal with a known part of the preamble; and
- one or more SOP indicators based on one or more normalized measures of the autocorrelation of the received waveform.

15. An apparatus as recited in claim 13, wherein the measure of the change in received signal strength is a measure of average power subtracted from a delayed average.

16. An apparatus as recited in claim 13, wherein the plurality of SOP indicators include two or more of:
- for each receive chain, the average received signal power;
- for each receive chain, the average power rise of the received signal for the receive chain;
- for each receive chain, at least one measure of the quality of the correlation of the input signal with a known part of the preamble;
- for each receive chain, at least one measure of the normalized autocorrelation of one or more sections of a known part of the preamble;
- a weighted sum across all receive chains of the average received signal powers;
- a weighted sum across all receive chains of the average power rise of the received signal;

a weighted sum across all receive chains of measures of the quality of the correlation of the input signal with a known part of the preamble; and a weighted sum across all receive chains at least one measure of the normalized autocorrelation of one or more sections of a known part of the preamble, wherein at least one of the SOP indicators that are weighted sums are included in the plurality of SOP indicators.

17. An apparatus in a receiver of a wireless network, the apparatus comprising:

a plurality of means for receiving a signal corresponding to a wireless transmission of a packet from a transmitting station of the wireless network, the packet having a preamble and a data part;

a plurality of means for calculating a respective plurality of start of packet (SOP) indicators, each for one or more of the receive means;

means for determining one or more linear combinations of respective pluralities of the calculated SOP indicators to form one or more combined SOP indicators;

means for comparing each of a plurality of SOP indicators or combined SOP indicators, including at least one of the combined SOP indicators to a respective threshold to form one or more respective SOP events; and means for determining a logic function of the SOP events to form a SOP decision event, wherein the plurality of SOP indicators include for each of at least two of the means for receiving at least one SOP indicator based on a measure of the received signal strength or based on a measure of the average received signal strength or based on a measure of a change in received signal strength or based on a measure of a change in an average of the received signal strength, or wherein the plurality of SOP indicators include two or more of:

one or more SOP indicators each based on a measure of a change in received signal strength or of a change in an average of the received signal strength;

one or more SOP indicators based on a measure of the received signal strength or of the average received signal strength;

one or more SOP indicators based on one or more measures of the quality of the correlation of the input signal with a known part of the preamble; and one or more SOP indicators based on one or more normalized measures of the autocorrelation of the received waveform.

18. An apparatus as recited in claim 17, wherein the plurality of SOP indicators include two or more of:

one or more SOP indicators each based on a measure of a change in received signal strength or of a change in an average of the received signal strength;

one or more SOP indicators based on a measure of the received signal strength or of the average received signal strength;

one or more SOP indicators based on one or more measures of the quality of the correlation of the input signal with a known part of the preamble; and one or more SOP indicators based on one or more normalized measures of the autocorrelation of the received waveform.

19. An apparatus as recited in claim 17, wherein the plurality of SOP indicators include two or more of:

for each means for receiving, the average received signal power;

for each means for receiving, the average power rise of the received signal for the receive chain;

for each means for receiving, at least one measure of the quality of the correlation of the input signal with a known part of the preamble;

for each means for receiving, at least one measure of the normalized autocorrelation of one or more sections of a known part of the preamble;

a weighted sum across all receive means of the average received signal powers;

a weighted sum across all receive means of the average power rise of the received signal;

a weighted sum across all receive means of measures of the quality of the correlation of the input signal with a known part of the preamble; and a weighted sum across all receive means at least one measure of the normalized autocorrelation of one or more sections of a known part of the preamble, wherein at least one of the SOP indicators that are weighted sums are included in the plurality of SOP indicators.

20. An apparatus as recited in claim 19, wherein the logic function is configurable.

* * * * *